(12) United States Patent
Rosenbaum et al.

(10) Patent No.: US 8,158,962 B1
(45) Date of Patent: Apr. 17, 2012

(54) SINGLE-PLATE NEUTRON ABSORBING APPARATUS AND METHOD OF MANUFACTURING THE SAME

(75) Inventors: Evan Rosenbaum, Marlton, NJ (US); Thomas G. Haynes, III, Tampa, FL (US); Krishna P. Singh, Jupiter, FL (US)

(73) Assignee: Holtec International, Inc.

( * ) Notice: Subject to any disclaimer, the term of this patent is extended or adjusted under 35 U.S.C. 154(b) by 0 days.

(21) Appl. No.: 12/432,509

(22) Filed: Apr. 29, 2009

Related U.S. Application Data

(60) Provisional application No. 61/048,707, filed on Apr. 29, 2008, provisional application No. 61/173,463, filed on Apr. 28, 2009.

(51) Int. Cl.
  *G21C 7/06* (2006.01)
  *G21C 19/00* (2006.01)
(52) U.S. Cl. ............... 250/518.1; 250/506.1; 376/272; 376/327; 376/432; 252/478; 252/636
(58) Field of Classification Search .......... 250/518.1, 250/506.1; 376/272, 327, 432; 252/478, 252/636
  See application file for complete search history.

(56) References Cited

U.S. PATENT DOCUMENTS

| | | | |
|---|---|---|---|
| 4,039,842 A | 8/1977 | Mollon | |
| 4,096,392 A * | 6/1978 | Rubinstein et al. | 376/272 |
| 4,124,445 A | 11/1978 | Mollon | |
| 4,218,622 A | 8/1980 | McMurtry et al. | |
| 4,225,467 A * | 9/1980 | McMurtry et al. | 252/478 |
| 4,287,145 A | 9/1981 | McMurtry et al. | |
| 4,382,060 A | 5/1983 | Holtz et al. | |
| 4,581,201 A | 4/1986 | Haggstrom et al. | |
| 4,610,893 A | 9/1986 | Eriksson et al. | |
| 4,626,402 A | 12/1986 | Baatz et al. | |
| 4,788,029 A | 11/1988 | Kerjean | |
| 4,988,473 A | 1/1991 | Mueller et al. | |
| 5,019,327 A | 5/1991 | Fanning et al. | |
| 5,198,183 A | 3/1993 | Newman | |
| 5,232,657 A | 8/1993 | Kovacik et al. | |
| 5,245,641 A | 9/1993 | Machado et al. | |
| 5,291,532 A | 3/1994 | Townsend et al. | |
| 5,365,556 A | 11/1994 | Mallie | |
| 5,438,597 A | 8/1995 | Lehnert et al. | |
| 5,479,463 A | 12/1995 | Roberts | |
| 5,629,964 A | 5/1997 | Roberts | |
| 5,841,825 A | 11/1998 | Roberts | |
| 5,914,994 A | 6/1999 | Wasinger et al. | |
| 5,965,829 A | 10/1999 | Haynes et al. | |
| 6,042,779 A | 3/2000 | Oschmann et al. | |

(Continued)

FOREIGN PATENT DOCUMENTS

DE  3216855 A1  11/1983

(Continued)

*Primary Examiner* — Nikita Wells
(74) *Attorney, Agent, or Firm* — The Belles Group, P.C.

(57) ABSTRACT

A neutron absorbing insert for use in a fuel rack and method of manufacturing the same. In ones aspect, the invention is a neutron absorbing apparatus for insertion into a fuel rack comprising: a sleeve having a first wall and a second wall, the first and second walls forming a chevron shape; and the first and second wall being a single panel of a metal matrix composite having neutron absorbing particulate reinforcement bent into the chevron shape along a crease.

22 Claims, 23 Drawing Sheets

U.S. PATENT DOCUMENTS

| | | |
|---|---|---|
| 6,283,028 B1 | 9/2001 | Walczak |
| 6,327,321 B1 * | 12/2001 | Holman ........................ 376/262 |
| 6,442,227 B1 | 8/2002 | Iacovino, Jr. et al. |
| 6,741,669 B2 * | 5/2004 | Lindquist ...................... 376/272 |
| 2011/0033019 A1 * | 2/2011 | Rosenbaum et al. ......... 376/272 |

FOREIGN PATENT DOCUMENTS

| | | |
|---|---|---|
| EP | 0626699 A1 | 11/1994 |
| JP | 0712985 A | 1/1995 |
| WO | WO2008063708 | 5/2008 |

* cited by examiner

SINGLE-PLATE NEUTRON ABSORBING APPARATUS AND METHOD OF MANUFACTURING THE SAME

CROSS-REFERENCE TO RELATED PATENT APPLICATIONS

The present application claims the benefit of U.S. Provisional Patent Application No. 61/048,707, filed Apr. 29, 2008, and U.S. Provisional Patent Application No. 61/173,463, filed Apr. 28, 2009, the entireties of which are hereby incorporated by reference.

FIELD OF THE INVENTION

The present invention relates generally to neutron absorbing apparatus and methods used to facilitate close packing of spent nuclear fuel assemblies, and more specifically to a single-plate neutron absorber apparatus and method of manufacturing the same. In other aspects, the invention relates to methods of supporting spent nuclear fuel assemblies in a submerged environment using the single-plate neutron absorber apparatus and a fuel rack system incorporating the single-plate neutron absorber apparatus.

BACKGROUND OF THE INVENTION

Nuclear power plants currently store their spent fuel assemblies on site for a period after being removed from the reactor core. Such storage is typically accomplished by placing the spent fuel assemblies in closely packed fuel racks located at the bottom of on site storage pools. The storage pools provide both radiation shielding and much needed cooling for the spent fuel assemblies.

Fuel racks often contain a large number of closely arranged adjacent storage cells wherein each cell is capable of accepting a spent fuel assembly. In order to avoid criticality, which can be caused by the close proximity of adjacent fuel assemblies, a neutron absorbing material is positioned within the cells so that a linear path does not exist between any two adjacent cells (and thus the fuel assemblies) without passing through the neutron absorbing material.

Early fuel racks utilized a layer of neutron absorbing material attached to the cell walls of the fuel rack. However, these neutron absorbing materials have begun to deteriorate as they have been submerged in water for over a decade. In order to either extend the period over which the fuel assemblies may be stored in these fuel racks, it is necessary to either replace the neutron absorber in the cell walls or to add an additional neutron absorber to the cell or the fuel assembly.

In an attempt to remedy the aforementioned problems with the deteriorating older fuel racks, the industry developed removable neutron absorbing inserts, such as the ones disclosed in U.S. Pat. No. 5,841,825 (the "'825 patent"), to Roberts, issued Nov. 24, 1998; U.S. Pat. No. 6,741,669 (the "'699 patent"), to Lindquist, issued May 25, 2004; and U.S. Pat. No. 6,442,227 (the "'227 patent"), to Iacovino, Jr. et al., issued Aug. 27, 2002. As of recent times, the neutron absorbing insert has become the primary means by which adjacent fuel assemblies are shielded from one another when supported in a submerged fuel rack. Thus, newer fuel racks are generally devoid of the traditional layer of neutron absorbing material built into the structure of the fuel rack itself that can degrade over time. Instead, fuel assembly loading and unloading procedures utilizing neutron absorbing inserts have generally become standard in the industry.

While the neutron absorbing inserts disclosed in the '825 patent, the '227 patent and the '699 patent have proved to be preferable to the old fuel racks having the neutron absorbing material integrated into the cell walls, these neutron absorbing inserts are less than optimal for a number of reasons, including without limitation complexity of construction, the presence of multiple welds, complicated securing mechanisms, and multi-layered walls that take up excessive space within the fuel rack cells. Additionally, with existing designs of neutron absorbing inserts, the inserts themselves must be removed prior to or concurrently with the fuel assemblies in order to get the fuel assemblies out of the fuel rack. This not only complicates the handling procedure but also leaves certain cells in a potentially unprotected state.

The '825 patent discloses a neutron absorbing apparatus which includes two adjacent neutron absorbing plates and a mounting assembly with latching means configured to be secured to fuel assemblies while the fuel assemblies remain under water in a fuel storage rack. The two neutron absorbing plates of the '825 patent are positioned orthogonally to form a chevron cross section which is placed about the fuel assemblies by insertion in the existing space between the fuel assemblies and the cell walls of a fuel storage rack. The primary embodiment of the neutron absorbing apparatus of the '825 patent utilizes a three layer configuration consisting of a backing plate (made of aluminum or stainless steel), a neutron absorbing sheet (made of cadmium, borated stainless steel, borated aluminum, or boron in a ceramic matrix), and a cover plate (made of aluminum or stainless steel). This multi-layer embodiment is both cumbersome and difficult to manufacture. Moreover, the absence of the neutron absorbing sheet at the fold in the backing plate and at the lateral edges of the backing plate is less than optimal and provides a potential area for increased reactivity.

It should be noted that the '825 patent also discloses a second embodiment of a neutron absorbing apparatus that allegedly eliminates any loss of nuclear absorber coverage at the fold in the backing plate and at the same time simplifies the fabrication process. In this embodiment, a special single-layer backing plate made of borated aluminum or borated stainless steel is used to replace the multi-layer arrangement of the primary embodiment. This special backing plate is itself a nuclear absorber and thus no additional absorber layer is added to provide the nuclear absorption. However, for this embodiment, the '825 patent teaches that the special backing plate must be formed by two plates arranged to form the chevron configuration and welded together at their juncture. In this regard, the '825 patent specifically states that for this embodiment "[t]he two individual plates are necessary because the borated backing plates cannot be folded, but must [be] welded. [T]he two borated backing plates . . . are welded together along [the] seam . . . to provide the chevron formation necessary to produce [the] plates . . . of the complete invention." For obvious reasons, welds and joints in the body of the neutron absorbing apparatus are less than optimal.

Turning to the '227 patent, a sleeve assembly for refurbishing a fuel rack having cells in which fresh or spent nuclear fuel assemblies may be stored is disclosed. The sleeve assembly of the '227 patent has at least one elongate wall extending from the topside of a sleeve base having an opposed bottom side. The sleeve base has a flow hole extending therethrough that communicates with one of the rack base plate flow holes. A pin assembly disposed in the sleeve base flow hole has resilient tabs extending beyond the bottom side of the sleeve base for extending into a rack base plate flow hole and resiliently engaging the rack base plate when the sleeve assembly is installed in one of the cells. The pin assembly resists horizontal and vertical movements of the sleeve assembly, permits water flow into the cell and permits sleeve assembly removal tools and inspection devices to access the pin assembly.

The '227 patent discloses an embodiment of a sleeve assembly having chevron shaped walls formed by a single-plate. The '227 patent discloses that these walls are an extruded composite of boron carbide and aluminum. The extruding process to form the chevron shaped walls is believed to be less than optimal as it is difficult to perform, yields unpredictable result, requires extremely tight tolerances and results in an inferior product.

Turning now to the '669 patent, a neutron absorber system for a nuclear fuel storage rack is disclosed that includes a neutron absorber that is adapted to attach to a plurality of cell walls of a cell of the nuclear fuel storage rack. The neutron absorber is adapted to elastically deform. Means for applying at least one stress to the neutron absorber and means for releasing the at least one stress to cause the neutron absorber to attach to the plurality of cell walls of the cell of the nuclear fuel storage rack is also disclosed.

In one embodiment, the '669 patent teaches a multi-plate longitudinal weldment to form the body of the neutron absorber system. Specifically, the '669 patent teaches welding a metal matrix alloy corner piece to two metal matrix neutron absorber composite plates to form the chevron shape. Welds and joints in the body of the neutron absorbing apparatus are less than optimal. These welds in this embodiment render the neutron absorber system less than optimal.

The '669 patent also teaches a neutron absorber system having chevron-shaped walls that are formed of a metal composite which includes neutron absorbing material, for example, boron carbide or a metal boron alloy, such as aluminum, magnesium, titanium, aluminum/magnesium or aluminum/titanium, in combination with boron, for example. The '629 patent also discloses that the material may be stainless steel/boron alloys and that besides boron carbide and elemental boron, any element with a high thermal neutron absorption cross section may be substituted. The '669 patent further states generally that the first wall and the second wall of the chevron-shaped body "may be formed of a unitary material or they may be formed separately and attached to each other, for example, via standard TIG welding or by friction stir welding." Despite this statement, the '669 patent is devoid of any enabling teaching as to how the chevron shaped body (which consists of the two walls connected along a longitudinal edge) is formed of a unitary material of a metal composite including a neutron absorbing material. Such materials tend to be very brittle when the percentage of boron carbide becomes substantial and thus, to date, it has been generally accepted in the art that only flat plates can be satisfactorily created from such materials. The only exception being the extruding process mentioned in the '227 patent, which as stated is less than optimal and undesirable. Therefore, the '669 patent also fails to teach a suitable neutron absorber insert and an enabling method of manufacturing such an insert.

These and other limitations of the prior art are overcome by the present invention which is described in the following detailed specifications.

SUMMARY OF THE INVENTION

It is therefore an object of the present invention to provide a neutron absorbing apparatus and a fuel rack system incorporating the same for the submerged storage of fuel assemblies.

Another object of the present invention is to provide a neutron absorbing apparatus having a chevron-shaped wall structure formed by bending a single plate of a metal matrix composite having neutron absorbing particulate reinforcement.

Yet another object of the present invention is to provide a method of manufacturing a neutron absorbing apparatus having a chevron-shaped wall structure by bending a single plate of a metal matrix composite having neutron absorbing particulate reinforcement.

Still another object of the present invention is to provide a fuel rack system incorporating a neutron absorbing apparatus having a chevron-shaped wall structure formed by bending a single plate of a metal matrix composite having neutron absorbing particulate reinforcement.

A further object of the present invention is to provide a neutron absorbing apparatus for slidable insertion into a cell of a submerged fuel rack that eliminates the need for complicated mechanisms for securement to a fuel assembly.

A yet further object of the present invention is to provide a neutron absorbing apparatus that can be slid into and out of a loaded cell of a submerged fuel rack without requiring removal of the fuel assembly.

A still further object of the present invention is to provide a neutron absorbing apparatus having a chevron-shaped wall structure constructed of a metal matrix composite having neutron absorbing particulate reinforcement that extends the entire length of a fuel assembly.

An even further object of the present invention is to provide a neutron absorbing apparatus having a chevron-shaped wall structure constructed of a metal matrix composite having neutron absorbing particulate reinforcement that extends the entire length of a fuel assembly and is adequately rigid and straight.

Another object of the present invention is to provide a neutron absorbing apparatus that can be easily and repetitively slid into and out of a loaded cell of a submerged fuel rack.

These and other objects are met by the present invention, which in one embodiment is a neutron absorbing apparatus comprising: a sleeve having first wall and a second wall, the first and second wall forming a chevron shape; and the first and second wall being a single panel of a metal matrix composite having neutron absorbing particulate reinforcement bent into the chevron shape along a crease.

In another aspect, the invention can be a method of manufacturing a neutron absorbing apparatus comprising: a) providing a panel of a metal matrix composite having neutron absorbing particulate reinforcement; and b) bending the panel into a chevron shape having first and second walls.

In yet another aspect, the invention can be a method of manufacturing a neutron absorbing apparatus comprising: a) providing a roll of boron carbide aluminum matrix composite; b) hot rolling the roll of boron carbide aluminum matrix composite; c) straightening and flattening the roll of boron carbide aluminum matrix composite using a hot roll leveler to create a panel of boron carbide aluminum matrix composite; d) shearing the panel of boron carbide aluminum matrix composite to a desired geometry; and e) bending the panel boron carbide aluminum matrix composite into a chevron shape having first and second longitudinal walls.

In still another aspect, the invention can be a method of creating a useful article having neutron absorbing properties comprising: a) providing a panel of a metal matrix composite having neutron absorbing particulate reinforcement; and b) bending the panel to form a chevron shape having first and second walls.

In a further aspect, the invention can be a system for supporting radioactive fuel assemblies in a submerged environment comprising: a fuel rack comprising a base plate and an array of cells; and a neutron absorbing insert slidably inserted into one or more of the cells, the neutron absorbing insert comprising a sleeve having first wall and a second wall, the first and second wall forming a chevron shape, and the first and second wall being a single panel of a metal matrix composite having neutron absorbing particulate reinforcement bent into the chevron shape.

DETAILED DESCRIPTION OF THE DRAWINGS

Neutron Absorbing Insert

First Embodiment

Figure 1:
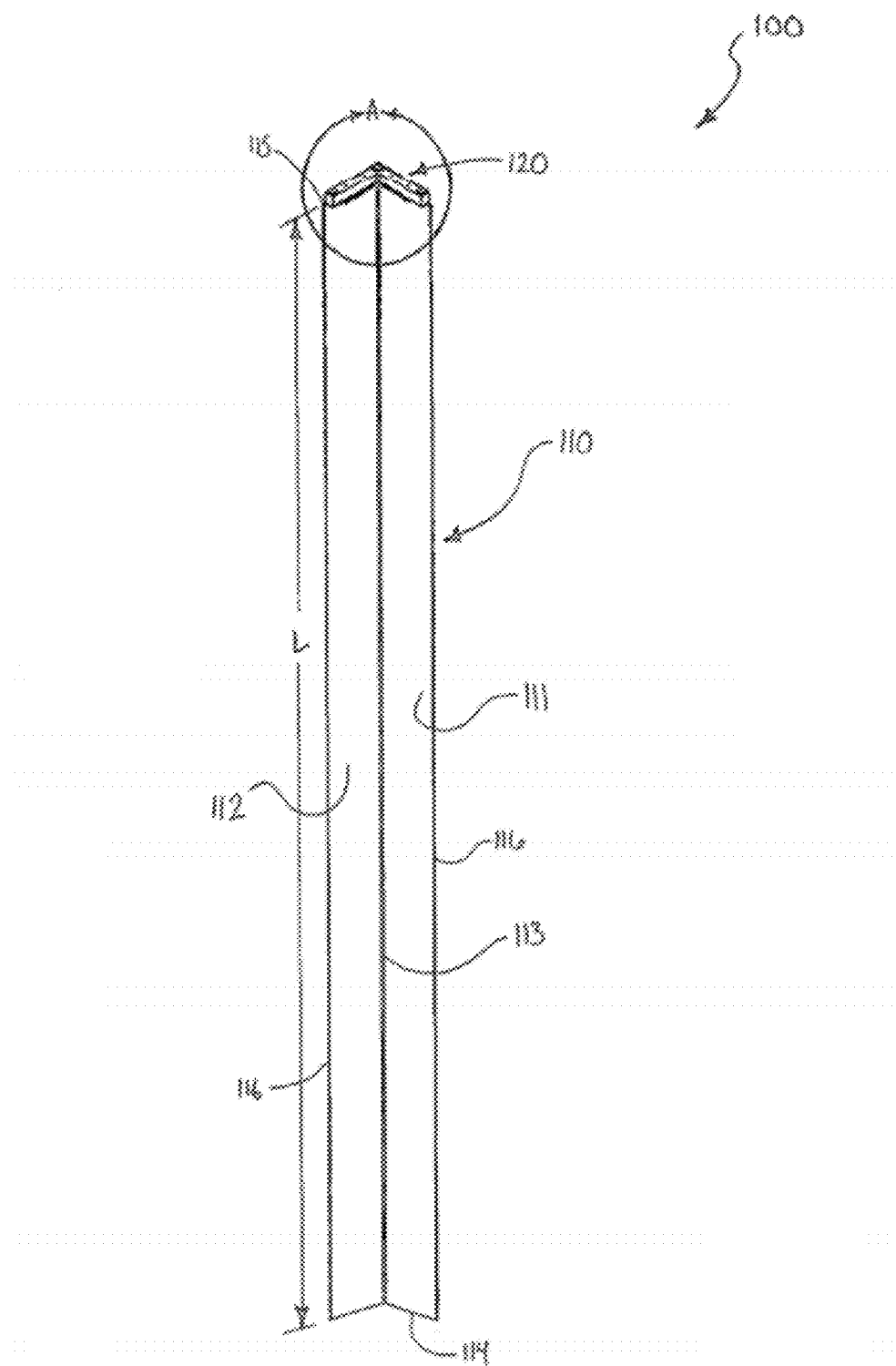
FIG. 1 is a top perspective view of a neutron absorbing insert according to one embodiment of the present invention.
Figure 2:
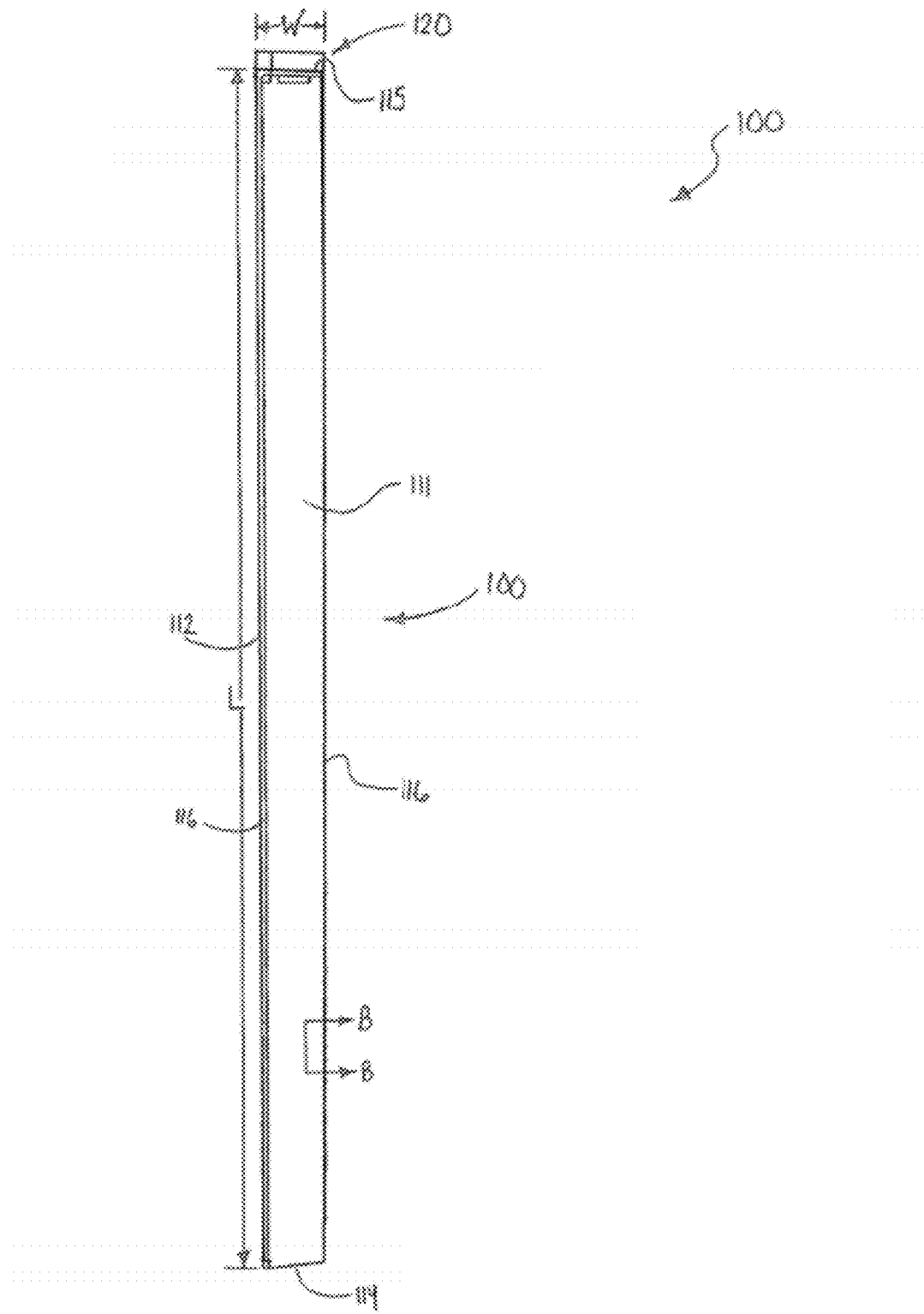
FIG. 2 is side view of the neutron absorbing insert of FIG. 1.
Figure 3:
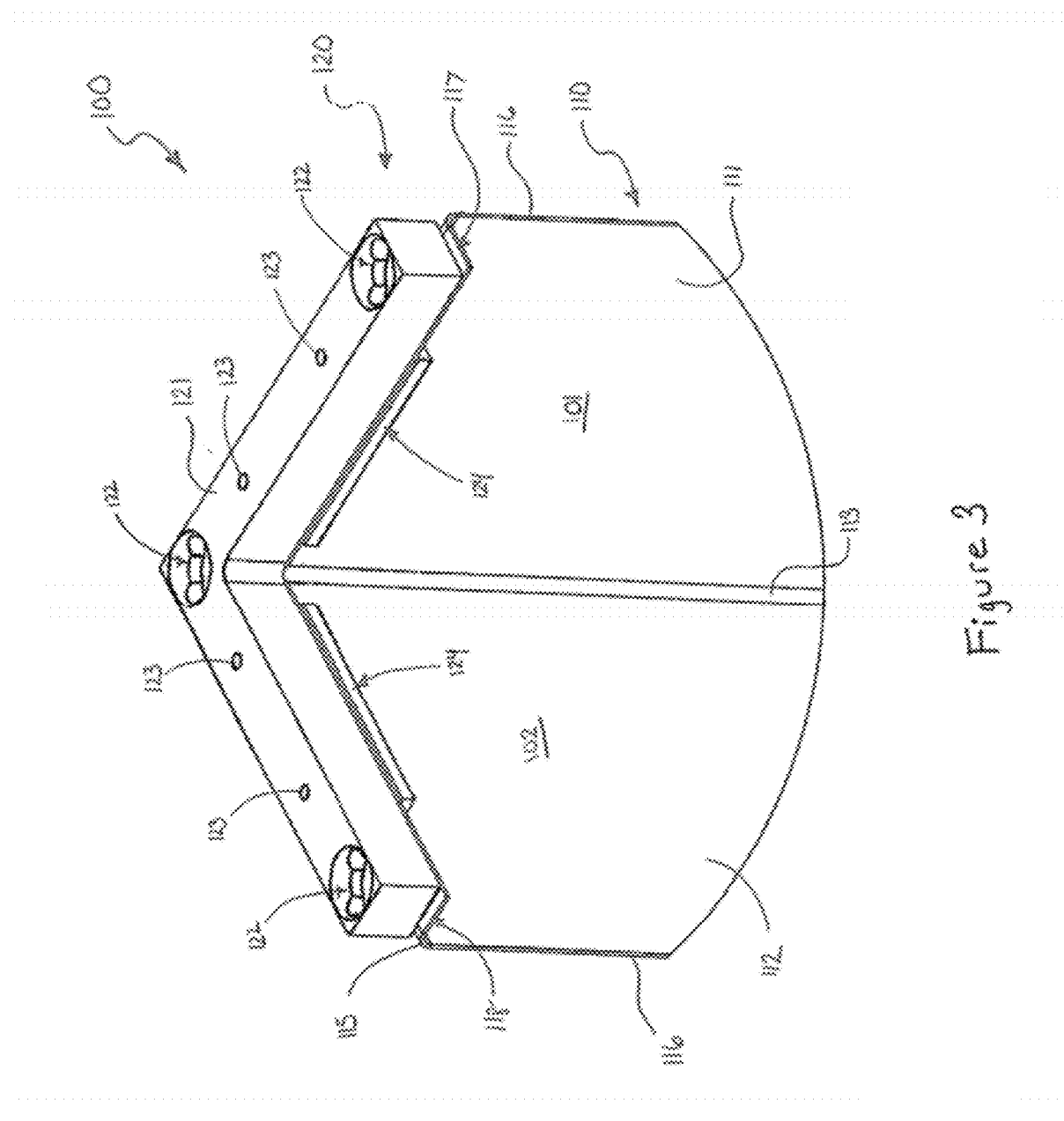
FIG. 3 is a close-up view of area A of FIG. 1 showing the detail of the top end reinforcement assembly of the neutron absorbing insert according to one embodiment of the present invention.

Referring first to FIGS. 1 and 2 concurrently, a neutron absorbing insert 100 according to one embodiment of the present invention is illustrated. The neutron absorbing insert 100 and the inventive concepts explained herein can be used in conjunction with both PWR or BWR storage requirements. The neutron absorbing insert 100 is specifically designed to be slidably inserted at strategic locations within the cell array of a submerged fuel rack. However, it is to be understood that the inventive neutron absorbing insert can be used in any environment (and in conjunction with any other equipment) where neutron absorption is desirable. Furthermore, in embodiments where the invention is based solely on the method of bending a metal matrix composite having neutron absorbing particulate reinforcement (or the resulting angled plate structure), the invention can be used in any environment and/or used to create a wide variety of structures, including without limitation fuel baskets, fuel racks, sleeves, fuels tubes, housing structures, etc.

The neutron absorbing insert 100 generally comprises a sleeve 110 and a reinforcement assembly 120 fastened to the top end of the sleeve 110. The sleeve 110 is chevron-shaped and constructed of a boron carbide aluminum matrix composite material. However, other metal matrix composites having neutron absorbing particulate reinforcement can be used. Examples of such materials include without limitation stainless steel boron carbide metal matrix composite. Of course, other metals, neutron absorbing particulate and combinations thereof can be used including without limitation titanium (metal) and carborundum (neutron absorbing particulate). Suitable aluminum boron carbide metal matrix composites are sold under the name Metamic® and Boralyn®.

The boron carbide aluminum matrix composite material of which the sleeve 110 is constructed comprises a sufficient amount of boron carbide so that the sleeve 110 can effectively absorb neutron radiation emitted from a spent fuel assembly and thereby shield adjacent spent fuel assemblies in a fuel rack from one another. In one embodiment, the sleeve 110 is constructed of an aluminum boron carbide metal matrix composite material that is 20% to %40 by volume boron carbide. Of course, the invention is so limited and other percentages may be used. The exact percentage of neutron absorbing particulate reinforcement required to be in the metal matrix composite material will depend on a number of factors, including the thickness (i.e, gauge) of the sleeve 110, the spacing between adjacent cells within the fuel rack, and the radiation levels of the spent fuel assemblies.

However, as space concerns within the fuel pond increase, it has become desirable that the sleeve 110 to take up as little room as possible in the cell of the fuel rack. Thus, the sleeve 110 is preferably constructed of an aluminum boron carbide metal matrix composite material having a percentage of boron carbide greater than 25%. While the addition of boron carbide particles to the aluminum matrix alloy increases the ultimate tensile strength, increases yield strength, and dramatically improves the modulus of elasticity (stiffness) of the material, it also results in a decrease in the ductility and fracture toughness of the material compared to monolithic aluminum alloys. Prior to the current inventive manufacturing process, these properties have limited the ways in which metal matrix composites having neutron absorbing particulate reinforcement could be used, thereby leading to difficulty in fabrication of the material into usable products.

However, as will be described in greater detail below, the current invention has made it possible to bend sheets of boron carbide aluminum matrix composite material (and other metal matrix composites having neutron absorbing particulate reinforcement). Thus, the walls 111, 112 of the sleeve 110 are formed into the chevron shape by bending a single sheet of boron carbide aluminum matrix composite material in an approximate 90 degree angle along its length. Of course, other angles can achieved. This inventive process will be described in greater detail below with respect to FIGS. 9-11.

Referring still to FIGS. 1 and 2, the sleeve 110 has a first longitudinal wall 111 and a longitudinal second wall 112. The first longitudinal wall 111 integrally connects to the longitudinal second wall 112 along crease 113. The first longitudinal wall 111 and the second longitudinal wall 112 form a chevron shaped structure (viewed from the top or bottom). The chevron shape formed by the first longitudinal wall 111 and the second longitudinal wall 112 has an approximately 90 degree angle. Of course, other angles are contemplated, both acute and obtuse.

Figure 7:
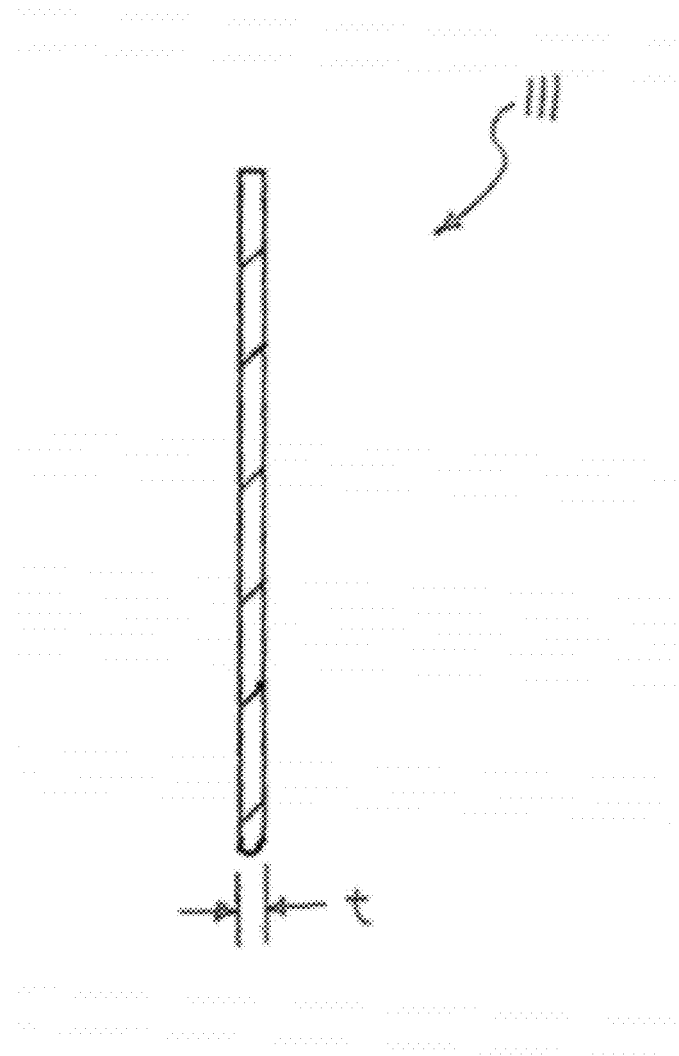
FIG. 7 is a cross-sectional view of the wall plate of the neutron absorbing insert along view B-B of FIG. 2.

The first longitudinal wall 111 integrally connects to the longitudinal second wall 112 are formed by bending a sheet of boron carbide aluminum matrix composite along the crease 113 to form the chevron shape with the desired angle. The sheet of boron carbide aluminum matrix composite (and thus the sleeve 110) has a gauge thickness t (FIG. 7) between 0.065 to 0.120 inches, and most preferably about 0.050 inches. The crease 113 is preferably formed with an apex radii between 0.375 to 0.625 inches. Of course, the invention is not limited to any specific apex radii or gauge thickness. However, these dimensions will affect process optimization parameters during the boron carbide aluminum matrix composite sheet bending procedure and should be considered, specifically the bending rate and required temperatures of the work piece and tools.

The sleeve 110 has a length L that extends from its bottom edge 114 to its top edge 115. The bottom edge 114 has a skewed shape to facilitate ease of insertion of the neutron absorbing insert 100 into a cell of a fuel rack. Specifically, the bottom edge 114 of each of the first and second longitudinal walls 111, 112 taper upward and away from the crease 113.

The length L of the neutron absorbing insert 100 is preferably chosen so that the sleeve 100 extends at least the entire height of the fuel assembly with which it is to be used in conjunction. More preferably, the length L is preferably chosen so that the bottom edge 114 of the sleeve 110 can contact and rest atop a base plate of a fuel rack when inserted into a cell of the fuel rack without the reinforcement assembly 120 contacting a fuel assembly loaded in that cell. In one embodiment, the length L of the sleeve 110 will be in a range between 130 and 172 inches, and more preferably between 145 and 155 inches.

Of course, the invention is not so limited and any length L may be used. In some embodiments, the length L of the sleeve 110 will only extend a fraction of the fuel assembly's height. In many instances this will be sufficient to shield adjacent fuel assemblies from one another because the irradiated uranium rods do not extend the entirety of the fuel assembly's height as the fuel assembly's lid and its base structure add to its height.

Each of the first and second longitudinal walls 111, 112 have a width W that extends from the crease to their outer lateral edges 116. The width W is preferably in the range between 4.25 to 8.90 inches, and most preferably about 5.625 inches. Of course, the invention is not limited to any particular width W. Further, in some embodiments the width of the first and second longitudinal walls 111, 112 may be different from one another if desired.

Furthermore, while the sleeve 110 is illustrated as a two-walled chevron shape embodiment, it is to be understood that the in some embodiments the sleeve 110 may have more than two longitudinal walls. It is preferred that the juncture between at least two of the walls be formed by bending but all junctures may be formed by bending if desired. The number of longitudinal walls will be dictated by the arrangement and shape of the cells in the fuel rack or apparatus in which the neutron absorbing insert 100 is to be used.

Figure 4:
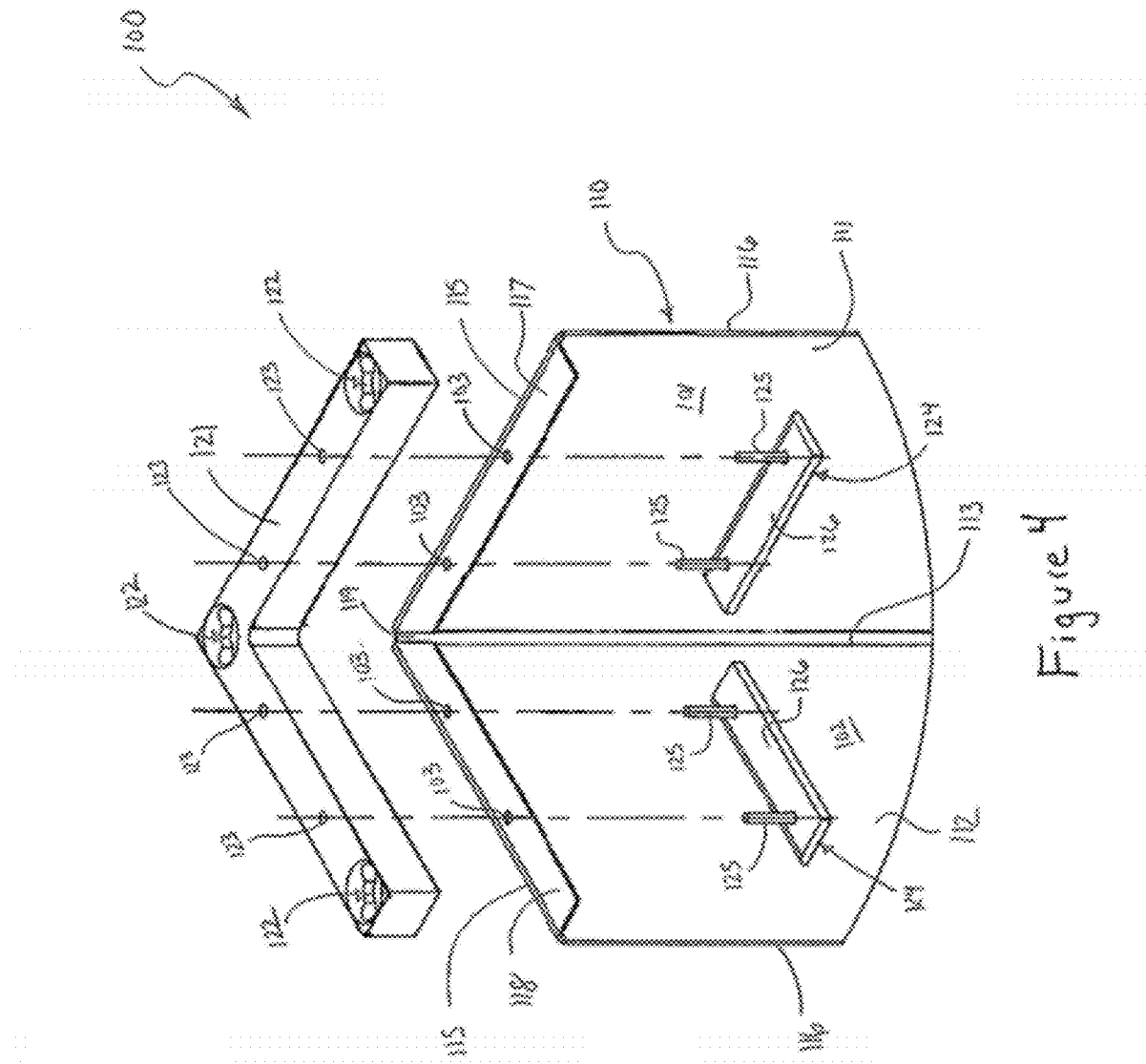
FIG. 4 is an exploded view of FIG. 3 showing the components of the top end reinforcement assembly.
Figure 5:
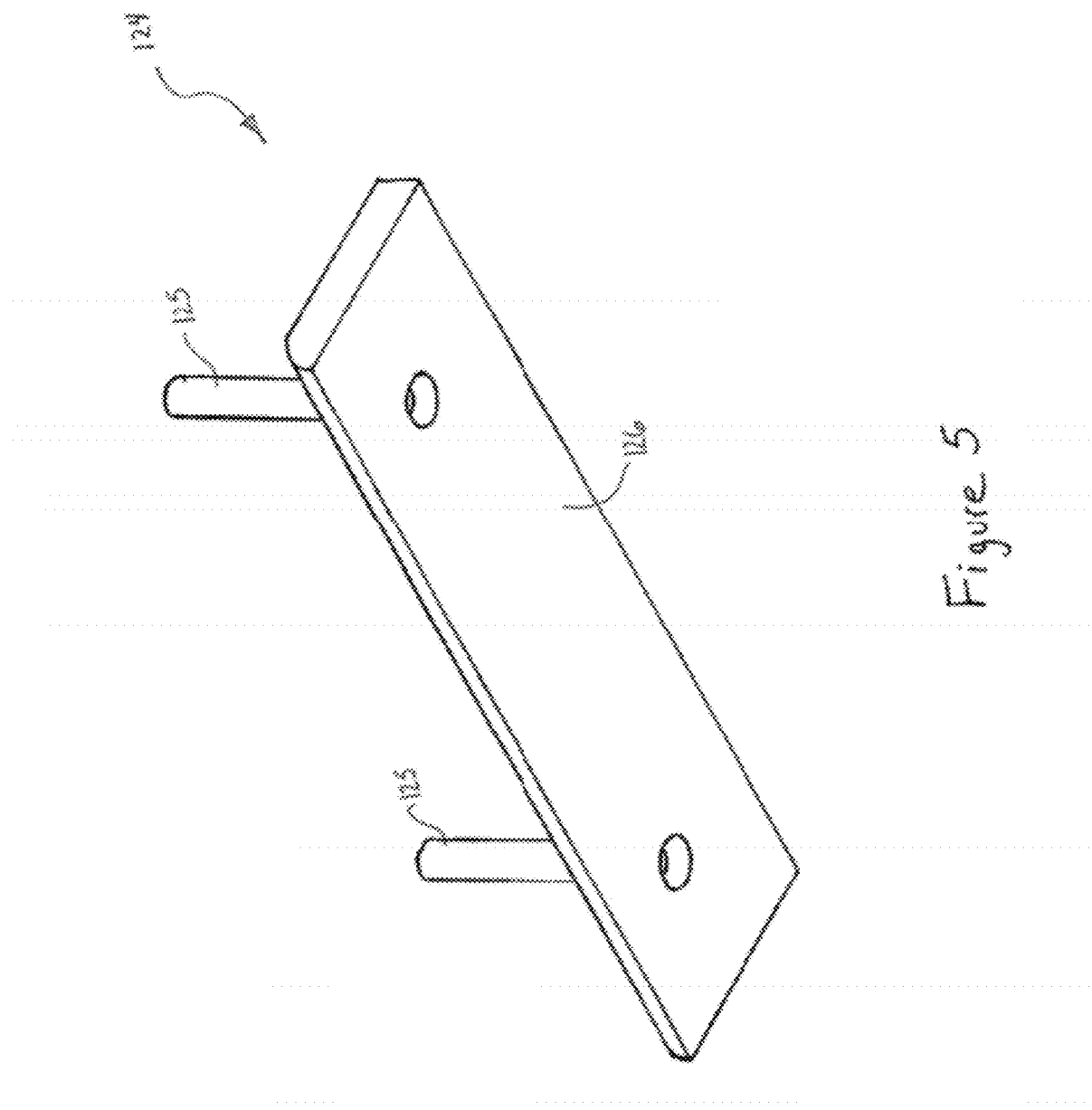
FIG. 5 is a bottom perspective view of the dowel member of the top end reinforcement assembly
Figure 6A:
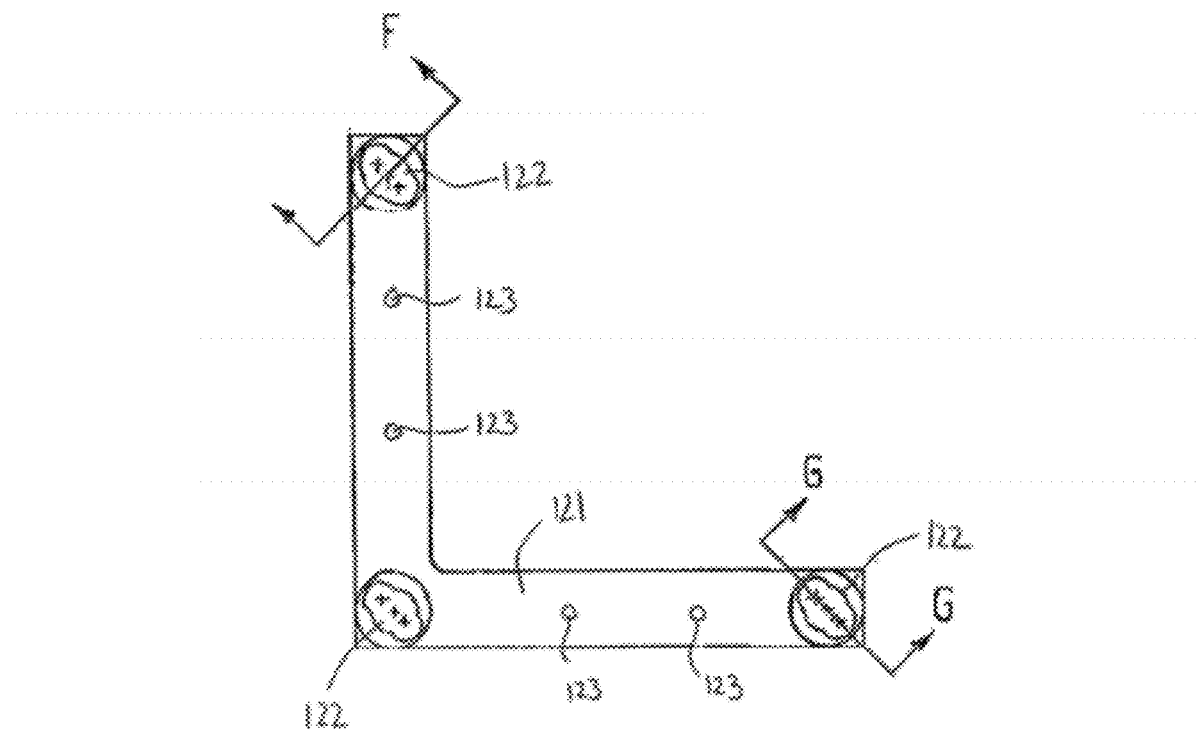
FIG. 6A is a top view of the block of the top end reinforcement assembly.
Figure 6B:
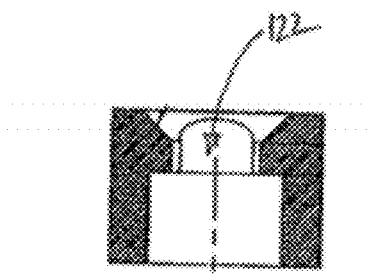
FIG. 6B is a cross-sectional view of the block of the top end reinforcement assembly along view F-F showing the detail of the hole for engaging a lifting tool.
Figure 6C:
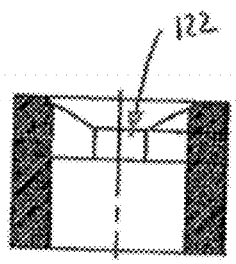
FIG. 6C is a cross-sectional view of the block of the top end reinforcement assembly along view G-G.

Referring now to FIGS. 3-6C concurrently, the structural and component details of the top end of the neutron absorbing insert 100 and the reinforcement assembly 120 will be described. The top end of the sleeve 110 comprises first and second flanges 117, 118 bent inwardly into the top end of each of the first and second longitudinal walls 111, 112. The flanges 117, 118 extend from the inner major surfaces 101, 102 of the first and second longitudinal walls 111, 112 at an approximately 90 degree angle. The flanges 117, 118 are arranged in an approximately orthogonal relationship to one another and are separated by a gap 119 (FIG. 4).

The flanges 117, 118 provide structural rigidity to the first and second longitudinal walls 111, 112 and also provide a connection area for the L-shaped reinforcement block 121. While the flanges 117, 118 are formed by bending the sheet of boron carbide aluminum matrix composite material, in other embodiments, the flanges can be connected in other ways as separate components (such as blocks) or omitted all together.

Each of the flanges 117, 118 comprise a plurality of holes 103 extending through the flanges 117, 118. The holes 103 are sized and shaped so that the dowels 125 of the dowel bar 124 can slidably pass therethrough.

The reinforcement assembly 120 generally comprises a reinforcement block 121 and a dowel bar 124. The reinforcement block 121 is an L-shaped solid block of aluminum. Of course, other shapes and materials can be utilized. Moreover, the reinforcement block 121 can be a plurality of blocks working together. The reinforcement block 121 serves two primary functions: (1) to provide structural rigidity and integrity to the neutron absorbing insert 100 (and the sleeve 110); and (2) to provide an adequately strong structure by which a handling mechanism can engage, lift, lower, rotate and translate the neutron absorbing insert 100.

The reinforcement block 121 comprises a plurality of engagement holes 122 that provide a geometry to which a lifting tool can engage for movement of the neutron absorbing insert 100. Of course, other mechanism can be used for the interlock mechanism, such as eye hooks, tabs, etc. Dowel holes 123 are also provide through the reinforcement block 121. The dowel holes 123 are sized and shaped to slidably accommodate the dowel pins 125 of the dowel bar 124 in a tight fit manner.

The dowel bar 124 comprises a body 126 having a top surface and a bottom surface. A plurality of dowel pins 125 protrude form the top surface of the body 126. The dowel bar 124 is preferably aluminum. When assemble, the dowel bars 124 are positioned below the flanges 117, 118 while the reinforcement bar 121 is positioned above the flanges 117, 118. The components 121, 124, 110 are properly aligned so that the dowel pins 125 are slidably inserted through the flange holes 103 and into the holes 123 on the reinforcement bar 121, thereby sandwiching the flanges 117, 118 therebetween. The dowels 125 are secured within the holes 123 of the reinforcement block 121 by any desired means, such as a tight-fit-assembly, welding, adhesion, threaded interlock, a bolt, etc.

Figure 8:
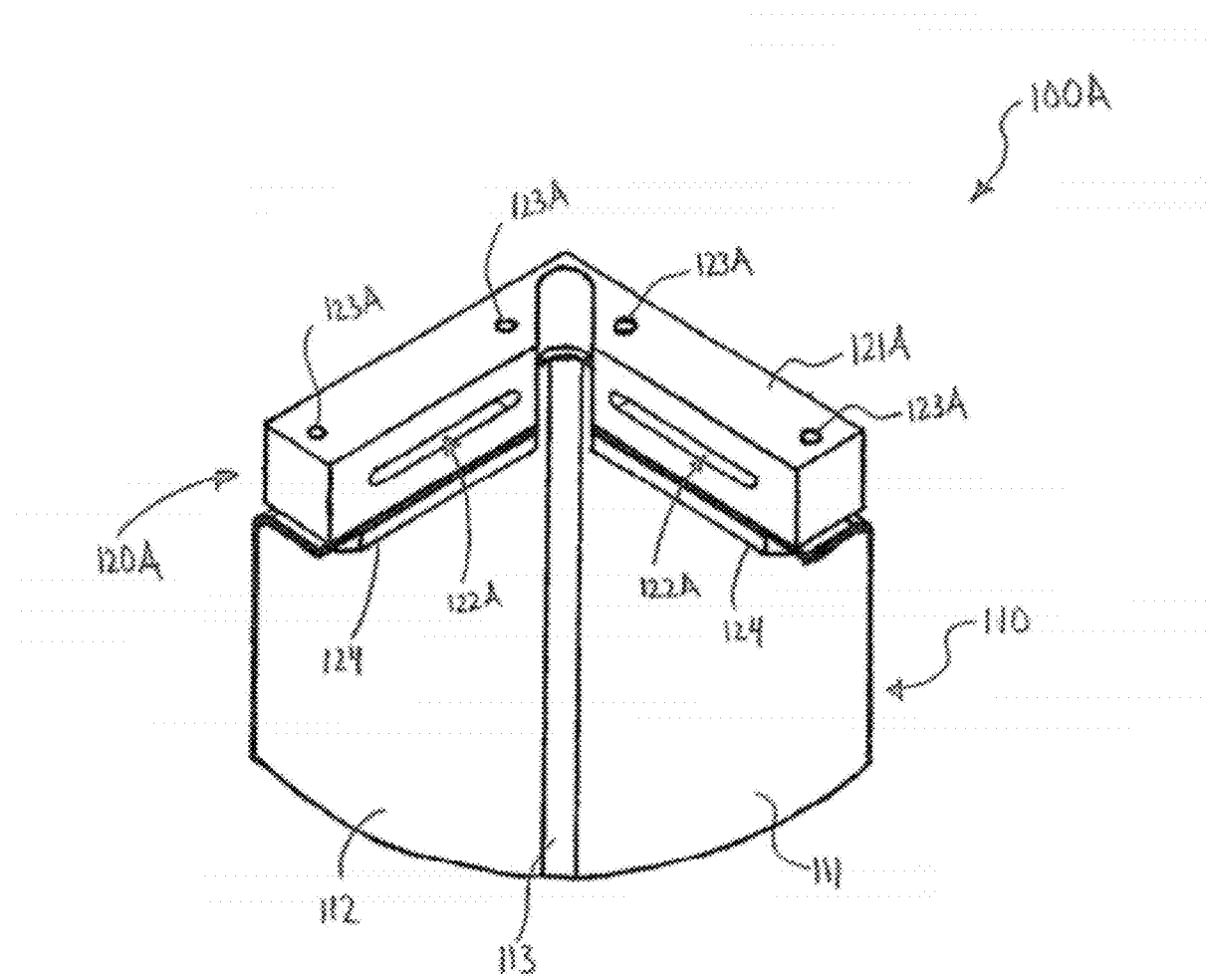
FIG. 8 is a close-up view of the top end reinforcement assembly of a neutron absorbing insert according to second embodiment of the present invention.

FIG. 8 is an alternative embodiment of a neutron absorbing insert 100A. The neutron absorbing insert 100A is identical to the neutron absorbing insert 100 described above with the exception that a different reinforcement mechanism 120A is utilized. As can be seen, the major difference is that the interlock holes 122A are slots extending laterally through the block body 121. The different design is utilized to accommodate a different handling tool.

Manufacturing Process For Bending A Metal Matrix Composite Having Neutron Absorbing Particulate Reinforcement As mentioned above, the sleeve 110 of the neutron absorbing insert 100 is formed by bending a single sheet of silicon carbide aluminum matrix composite material. Since the boron carbide aluminum metal matrix composite material (and other metal matrix composite having neutron absorbing particulate reinforcement) exhibit the high stiffness and low ductility mechanical properties—they have proved to be very difficult and/or impossible to fabricate using conventional metal work equipment and metallurgical practices. This difficulty in fabrication become even more difficult as the particulate reinforcement level increase approach 25% volume loading or greater of ceramic particulate. At high ceramic particulate volume loadings the elongation drops by a factor of 3 to 4 compared to the monolithic conventional aluminum alloys. To further increase the difficulty of fabricating the metal matrix composite material addition of the ceramic particulate dramatically increase the flow stress by up to 25 percent as the reinforcement loading level increases in the aluminum matrix.

In order to make possible the useful bending of silicon carbide aluminum matrix composite material, a novel and nonobvious manufacturing process has been developed, referred to herein as "hot fabrication process technology." This process will be described in detail below. It has only been through the development of this hot fabrication process technology that the formation of useful products through bending of silicon carbide aluminum matrix composite material has become possible. Of course, the fundamentals of this process can be easily applied to other metal matrix composite materials having neutron absorbing particulate reinforcement, with minor process parameter optimization.

In order to successfully bend an aluminum boron carbide metal matrix composite material into a "chevron" profile one must modify all equipment and process parameters compared to conventional aluminum alloys in a number of ways.

In order to produce suitable panels (i.e., sheets) of aluminum boron carbide metal matrix composite material, the quality of the work rolls used in the rolling process are first improved to overcome the abrasive nature and the propensity of the rolls to dimple during the sheet fabrication process. This is done through a hot rolling step. The hot rolling is performed while maintaining the material rolling temperature between 890 to 1010° F. Because the panels are so thin, the rollers (and other tools) are also heated to temperatures corresponding to the temperature of the panel at that step so as to eliminate rapid heat loss from the panel when contact is made with the rollers (or other interfaces).

Once hot rolled, the rough panels are thermally straightened and flattened. In order to straighten and flatten the panel to meet the necessary specifications—a modified roll leveler is used. The roll leveler is modified to allow for "hot" roll leveling between a 750-1000° F. operating temperature. The roll leveler is designed to accommodate high temperature leveling without seizing up.

The rough hot panel is then sheared to the desired final length and width. At this time, the necessary skew is sheared into the bottom edge of the panel, resulting in the panel 100 shown at FIG. 9A.

Figure 9D:
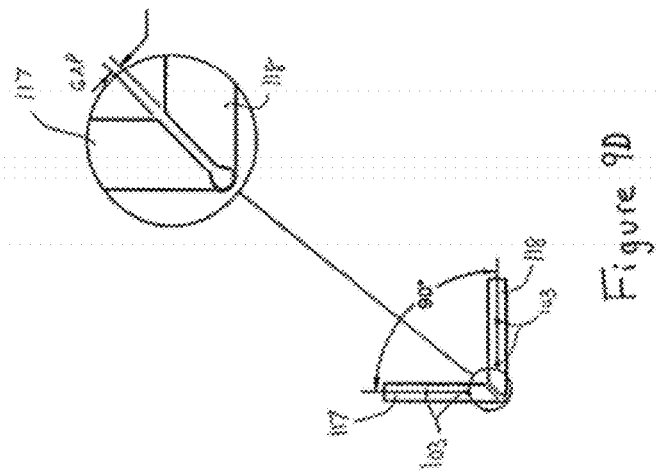
FIG. 9D is a top view of the flat sheet of FIG. 9C wherein the flat sheet has been bent longitudinally along line D-D of FIG. 9C to form the chevron-shaped sleeve portion.
Figure 9C:
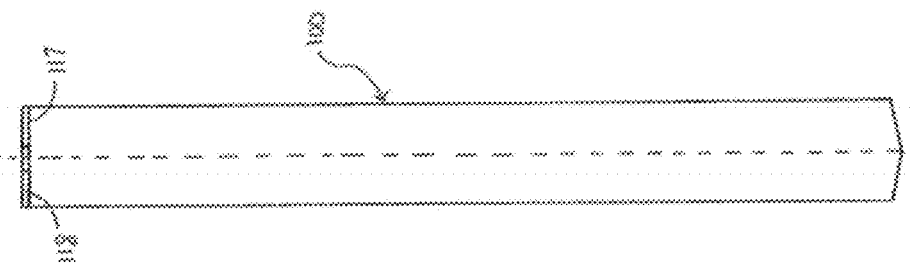
FIG. 9C is a front view of the flat sheet of FIG. 9B wherein the top ends of the flat sheet have been bent downward along line C-C of FIG. 9B to form first and second flanges.
Figure 9B:
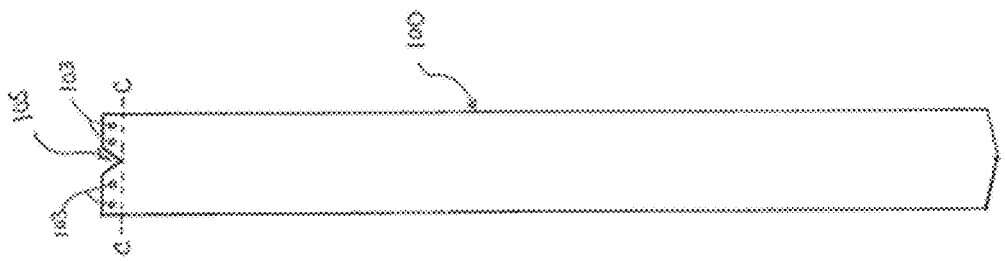
FIG. 9B is a front view of the flat sheet of FIG. 9A with a V-shaped notch and dowel holes punched therein.
Figure 9A:
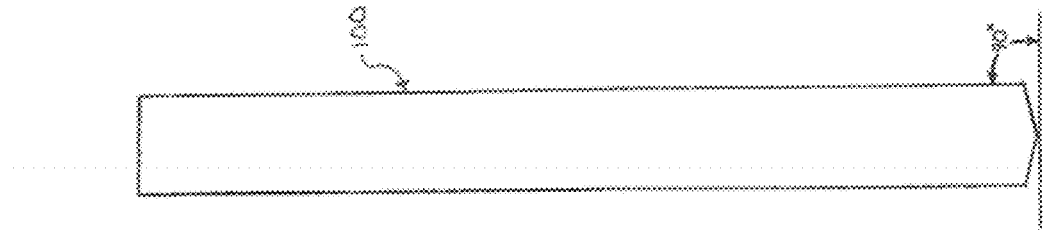
FIG. 9A is front view of a flat sheet of metal matrix composite having neutron absorbing particulate reinforcement that has been cut to the desired size and geometry so that it can be bent to form the chevron-shaped sleeve portion of the neutron absorbing insert of FIG. 1 according to one embodiment of the present invention.

Subsequently, a V-shaped notch 105 is cutout of the top edge of the panel 100 and the dowel holes 103 are punched therein (FIG. 9B). The flanges 117, 118 are then bent into the panel 100 by bending the panel 100 along line C-C (FIG. 9B).

Figure 10:
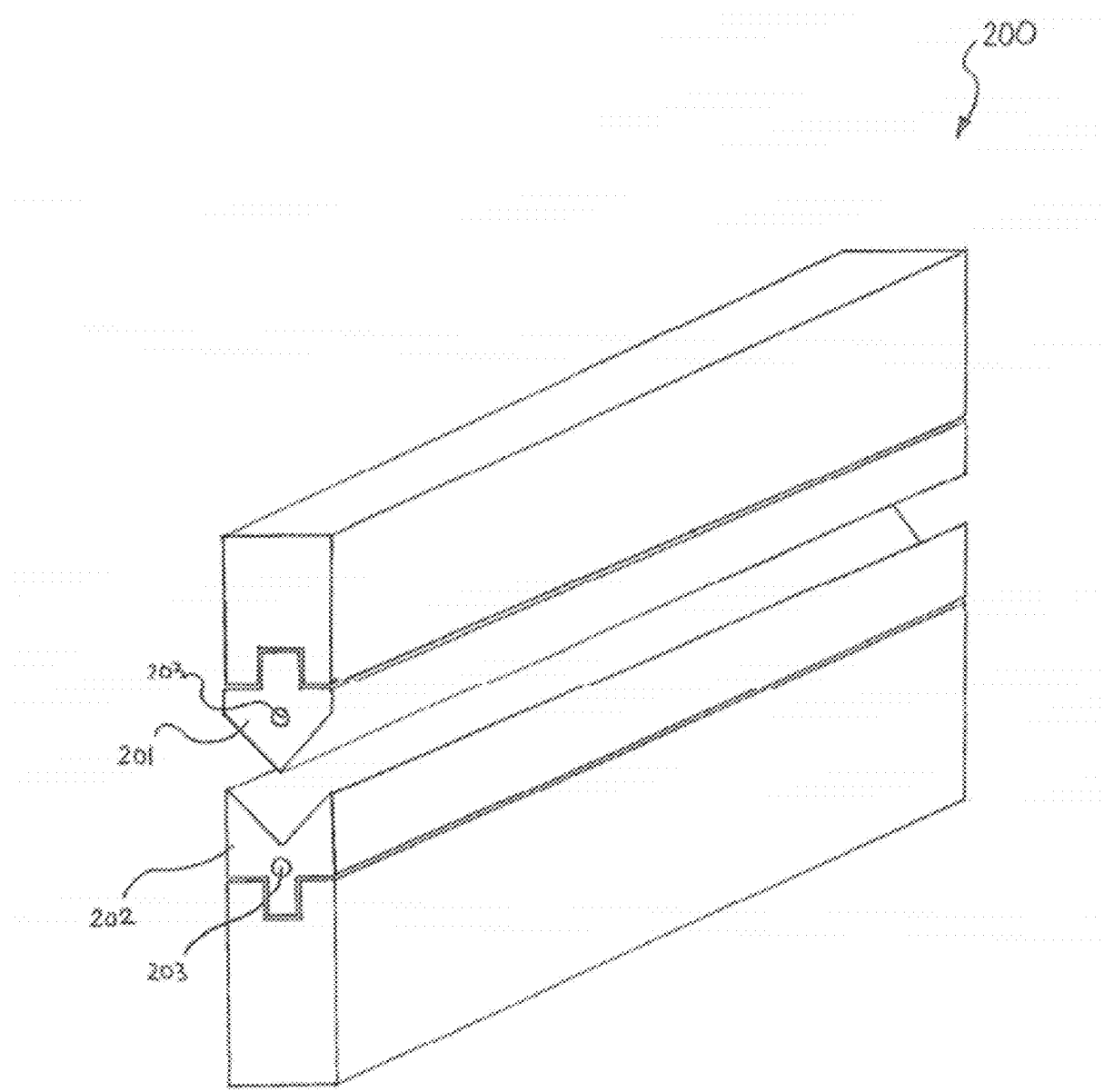
FIG. 10 is a schematic representation of a hot press used to bend the flat sheet along line D-D of FIG. 9C to form the chevron-shaped sleeve portion according to one embodiment of the present invention.

The panel 100 is then bent into the chevron shape along line D-D (FIG. 9C) using the hot brake press 200 illustrated in FIG. 10. In order to bend the panel 100 into the chevron profile, the brake punch 201 and die 202 of the brake press 200 are heated to a temperature above 500 degrees Fahrenheit, and preferably between 500 and 1000 degrees Fahrenheit, using immersion heaters 203. The tip of the brake punch 201 has a ⅛ inch radius while the corresponding valley of the die 202 terminates at an apex having a radius of 3/16 inch. The panel 100 is also heated to a temperature above 750° F., preferably between 890-1010° F., before bending the panel 100 into chevron profile illustrated in FIG. 9D.

Figure 11:
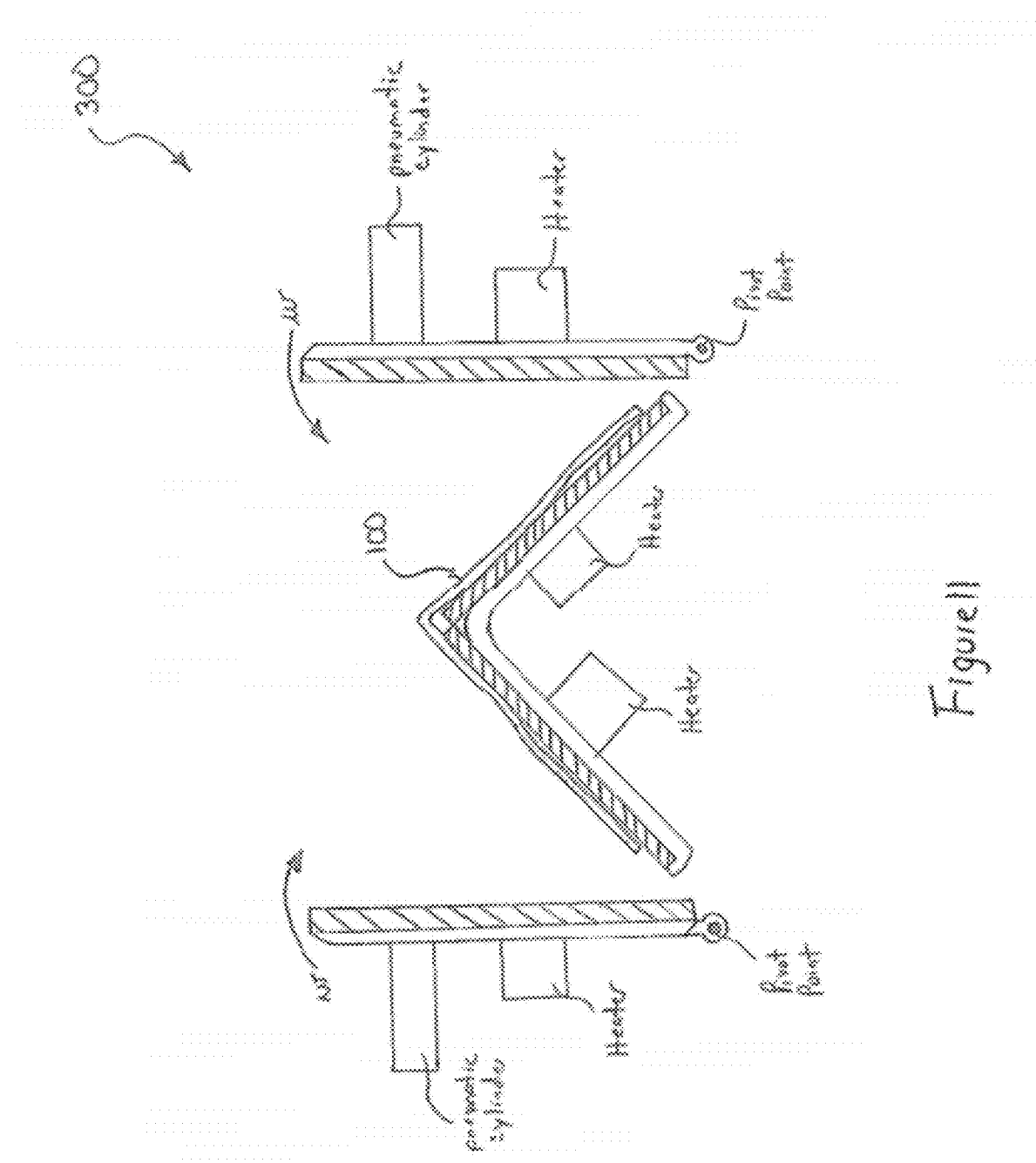
FIG. 11 is a schematic of a thermal straightening press used to flatten and straighten the walls of the chevron-shaped sleeve portion according to one embodiment of the present invention.

The last step in the process is a thermal flattening operation performed on the thermal press 300 illustrated in FIG. 11. The thermal flattening operation coins the chevron profile of the sheet 100 to meet a 90°+/×2° apex angle and flatten the longitudinal walls to meet the customer flatness and twist specification. This thermal flattening/coin operation is performed in a specially designed fixture/tool 300 which develops a minimum pressure of 20 pounds per square inch and uniform pressure distribution over the entire length of the chevron profiled panel 100.

Figure 12:
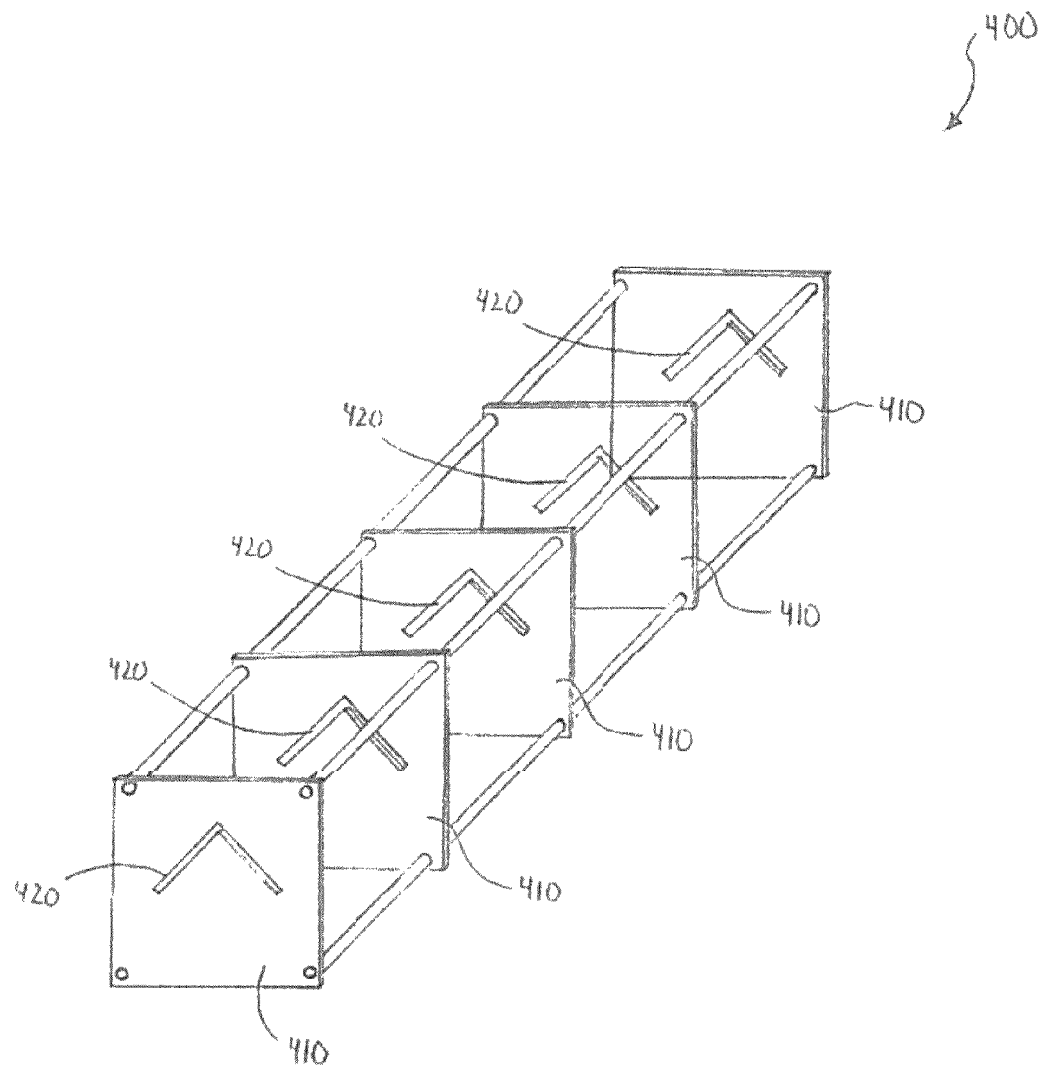
FIG. 12 is a schematic of a tool for checking the straightness of the chevron-shaped sleeve portion according to one embodiment of the present invention.
Figure 13:
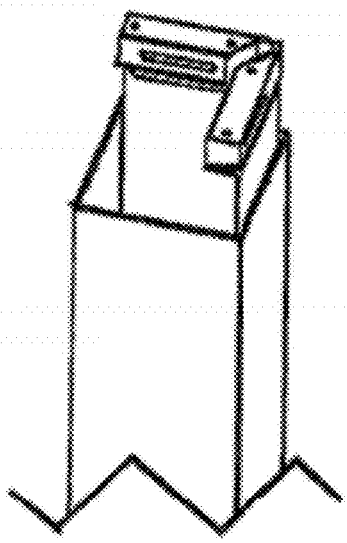
FIG. 13 is a perspective view of the neutron absorbing insert of FIG. 8 slidably inserted into an empty cell of a submerged fuel rack according to an embodiment of the present invention.
Figure 13:
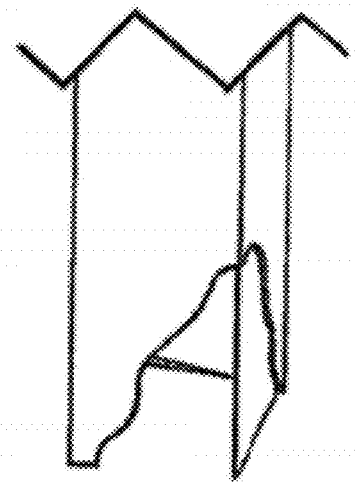
Figure 14:
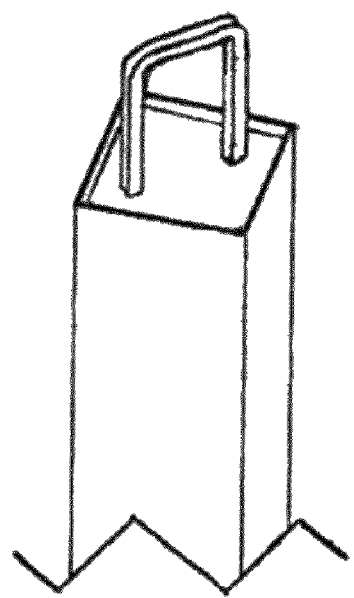
FIG. 14 is a perspective view of a fuel assembly in a submerged fuel rack.
Figure 14:
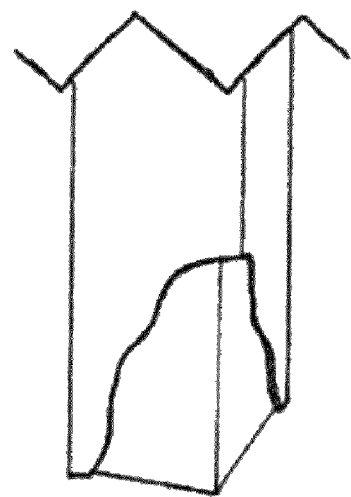
Figure 15:
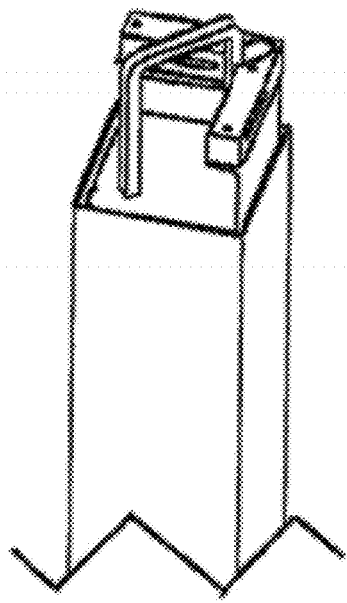
FIG. 15 is a perspective view of submerged fuel rack having a fuel assembly loaded into one of the cells and the neutron absorbing insert of FIG. 8 slidably inserted into the cell about the fuel assembly.
Figure 15:
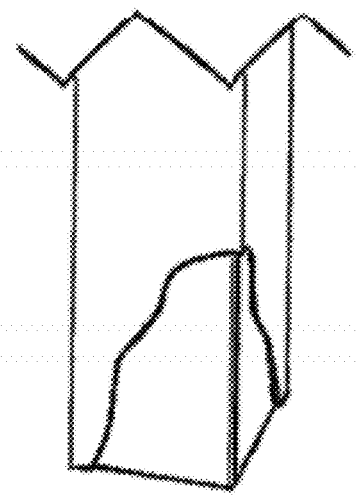

FIG. 12 illustrates a device 400 for checking the flatness and straightness of the final chevron-shaped sleeve panel 100.

The device 400 has a plurality of parallel steel plates 410 having aligned slots 420 that allow the chevron-shaped sleeve panel 100 to slide therethrough if it is within specification.

It should be pointed out that part of the novelty of this technology is the flex-ability of the process to manufacture chevrons to meet PWR or BWR or any other fuel manufacturer fuel storage requirements. Chevrons have been manufactured with legs from 4.250"-8.900" width, gauge thickness for 0.065"-0.120"T, apex radii from 0.375-0.625 inches, and lengths from 130-172" L. It appears from initial fabrications that the process is very scalable and is capable of meeting all known spent fuel storage applications.

Alternative Embodiment & Loading Method For The Same

Referring now to FIGS. 16-23, an alternative embodiment of a neutron absorbing insert 500 (and a method of installing the same in a fuel rack) according to the present invention is disclosed. The neutron absorbing insert 500 is similar to the neutron absorbing insert 100 described above in materials, specification and manufacture of the sleeve portion. Thus, only those details of the neutron absorbing insert 500 that differ from the neutron absorbing insert 100 will be described in detail below with the understanding that the discussion above is fully applicable.

Figure 16:
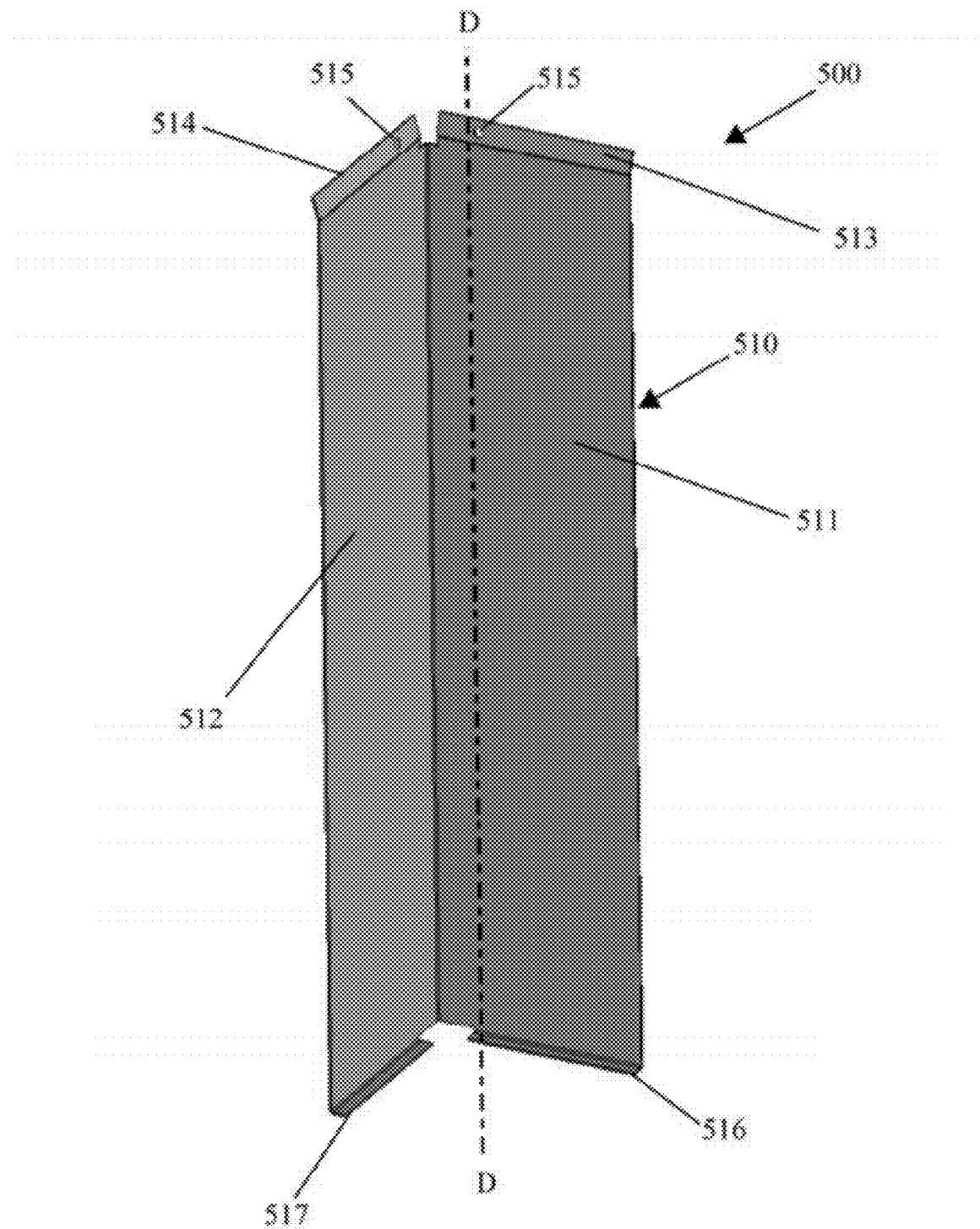
FIG. 16 is a perspective view of a neutron absorbing insert according to an alternative embodiment of the present invention.
Figure 17A:
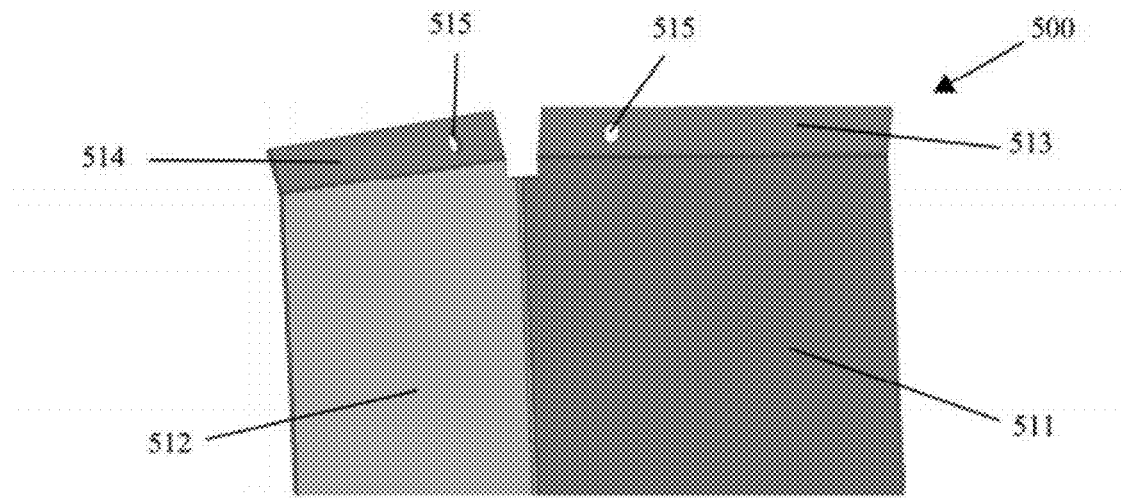
FIG. 17A is a close-up view of the top portion of the neutron absorbing insert of FIG. 16.
Figure 17B:
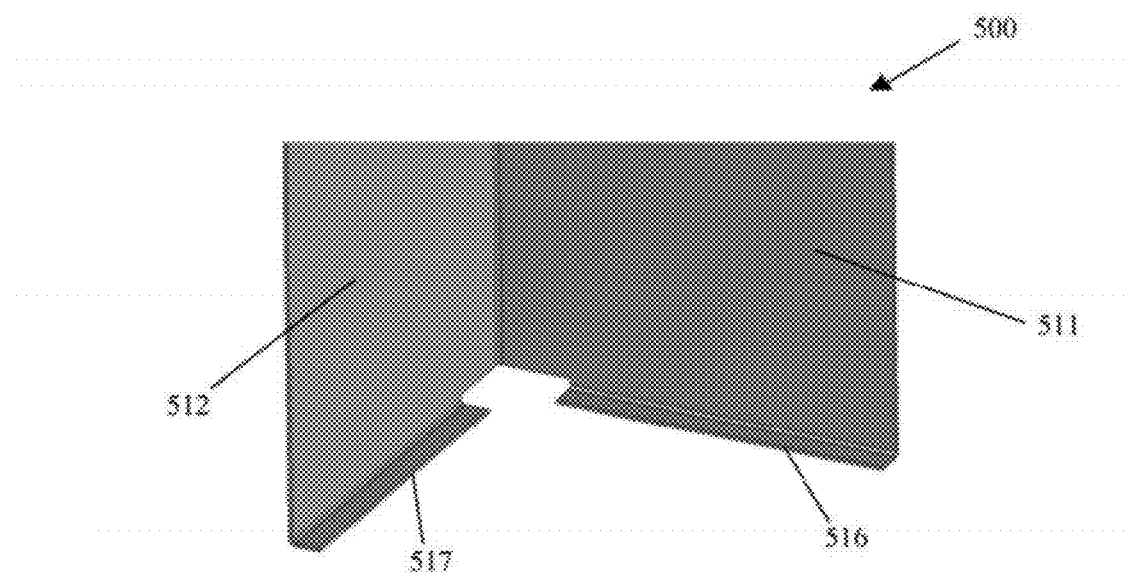
FIG. 17B is a close-up view of the bottom portion of the neutron absorbing insert of FIG. 16.

Referring first to FIGS. 16, 17A and 17B concurrently, the neutron absorbing insert 500 generally comprises a sleeve 510. Unlike the neutron absorbing insert 100, the neutron absorbing insert 500 does not have a reinforcement block or structure at the top of the sleeve 510. Instead, the tops of the walls 511, 512 of the sleeve 510 comprise flanges 513, 514 that are formed by bending the walls 511, 512

The flanges 513, 514 extend from the walls 511, 512 outwardly away from the axis D-D of the neutron absorbing insert 500 so as to allow a fuel assembly to move freely along axis D-D without obstruction from the flanges 513, 514. This allows the fuel assembly to be loaded into and unloaded from a cell within the fuel rack that utilizes the neutron absorbing insert 500 without the need to remove the neutron absorbing insert 500 during such procedures. The flanges 513, 514 are preferably inclined upward and away from the axis D-D, thereby forming a funnel structure for guiding the fuel assembly into proper position during a loading procedure. The inclined nature of the flanges 513, 514 also minimizes the horizontal space in which the flanges 513, 514 extend, thereby minimizing the possibility of interfering with adjacent cells in the fuel rack. In other embodiments, the flanges may be bent at a 90 degree angle to the walls 511, 512 if desired. Furthermore, while the flanges 513, 514 are preferably formed by bending the top ends of the walls 511, 512, the flanges 513,514 may, of course, be omitted all together or can be connected as separate structures in other embodiment. Moreover, a reinforcement block or structure can also be utilized if desired. In such a scenario, the reinforcement structure is preferably located on the outside surface of the walls 511, 512 so as to avoid obstructing free movement of the fuel assembly along axis D-D.

Holes 515 are provided in the flanges 513, 514 so as to provide a simple mechanism by which the neutron absorbing insert 500 can be lifted and lowered within the fuel pool by a hook or other grasping tool. Of course, the holes 515 could be provided in the walls 511, 512 or can be omitted all together so long as some structure or surface arrangement is provided for facilitating movement of the neutron absorbing insert 500.

The neutron absorbing insert 500 also comprises flanges 516, 517 located at the bottom end of the sleeve 510. The flanges 516, 517 extend inwardly toward the axis D-D of the neutron absorbing insert 500. As will be discussed in grater detail below, this allows the neutron absorbing insert 500 to be adequately secured to the fuel rack at its bottom end and in a manner that does not interfere with loading and/or unloading the fuel assembly along axis D-D. The flanges 516, 517 are preferably formed at an approximate 90 degree angle to the walls 511, 512 but the invention is not so limited. Furthermore, while the flanges 513, 514 are preferably formed by bending the bottom ends of the walls 511, 512, the flanges 513,514 may, of course, be connected as separate structures in other embodiments. The radius of curvature discussed above for the crease can be used for the bottom flanges.

Figure 18:
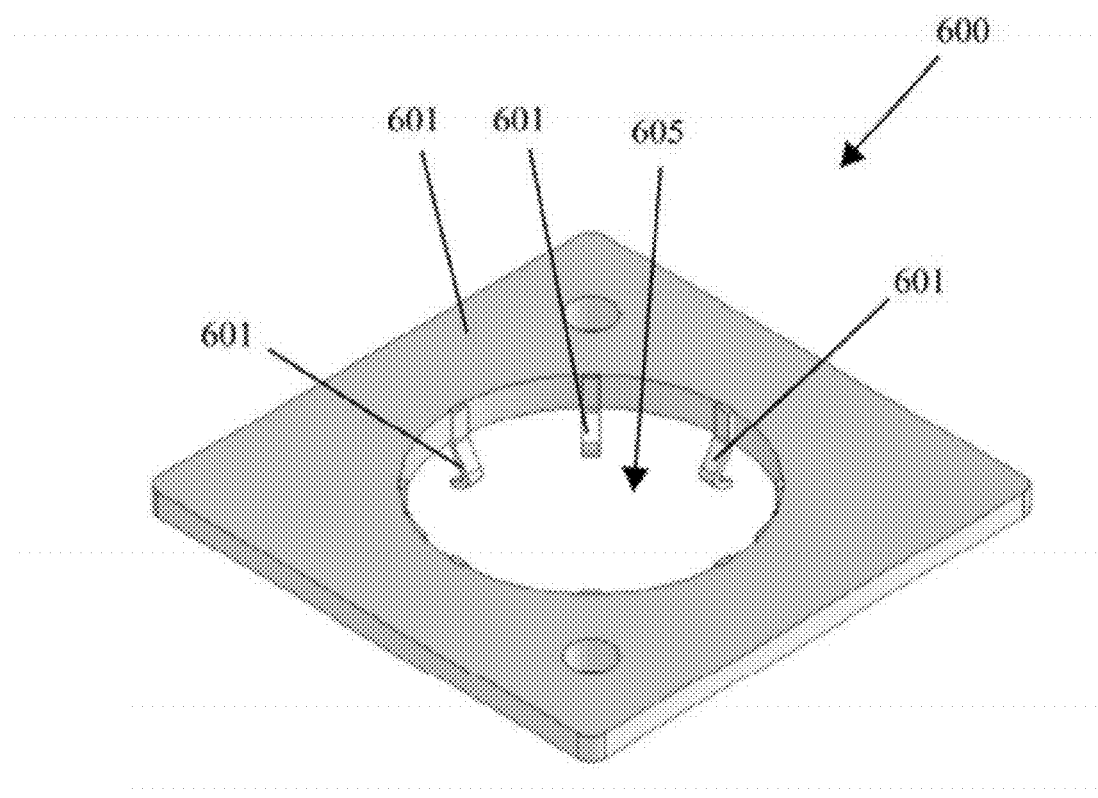
FIG. 18 is a perspective view of a hold-down plate that is used to detachably secure the neutron absorbing insert within a cell of a fuel rack.

Referring now to FIG. 18, a hold-down plate 600 is illustrated. The hold-down plate 600 comprises a plate-like body 601 formed of aluminum or other non-corrosive material. The plate 601 is of sufficient thickness to be adequately rigid so as not to deflect when performing its anchoring function discussed below. A central hole 605 is provided in the plate 601. A plurality of bendable pins or barbs 602 are attached to the plate 601 about the periphery of the central hole 605 in a circumferentially spaced apart arrangement. The barbs 601 extend beyond and protrude form the bottom surface of the plate 601. The barbs 602 are movable between an open position in which the barbs 601 can pass through a flow hole in the floor of a cell in the fuel rack and a locking position in which the barbs 601 engage the floor of a cell in the fuel rack. While the securing structure is illustrated as bendable barbs, the neutron absorbing insert 500 can be secured to the fuel rack in a variety of ways, including resilient tangs, a conical ridge that forms a tight-fit with the hole in the floor, fasteners, clamps, and/or combinations thereof. In one embodiment, rotatable cams may be used.

Figure 19A:
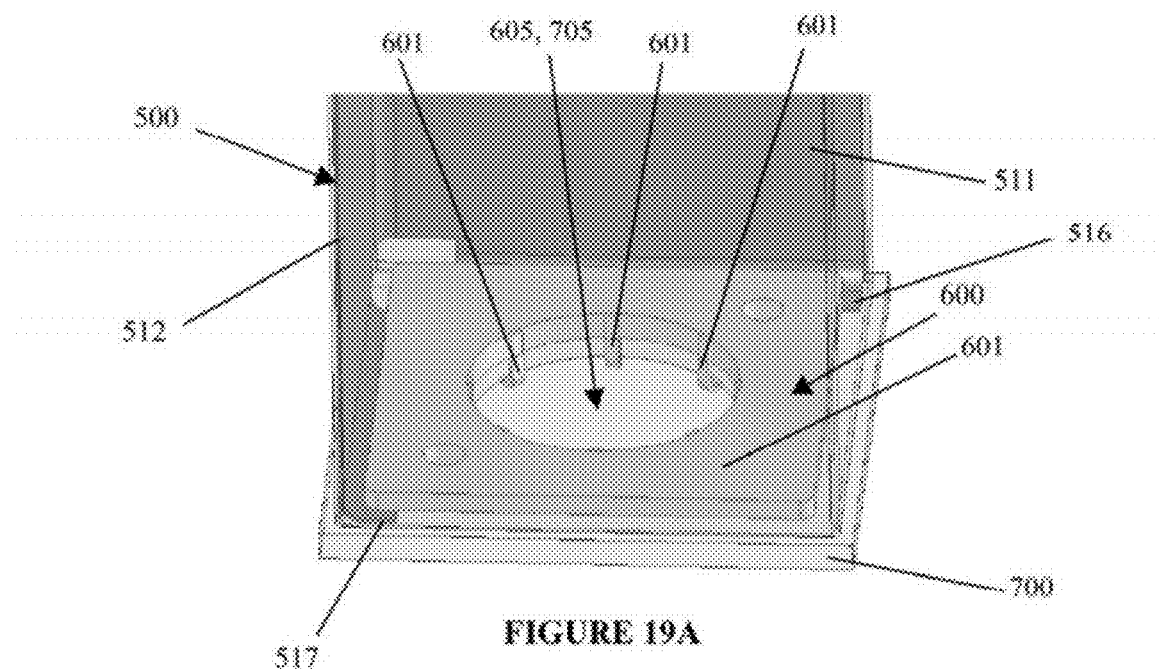
FIG. 19A is a top perspective view of neutron absorbing insert of FIG. 16 secured in place to the fuel rack by the hold-down plate of FIG. 18.
Figure 19B:
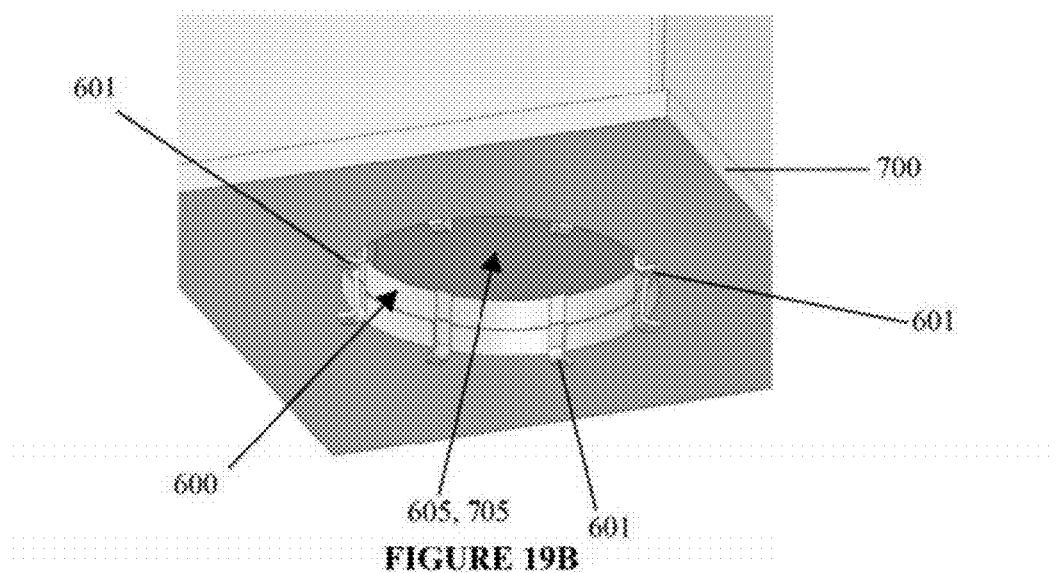
FIG. 19B is a bottom view of the fuel rack when the neutron absorbing insert of FIG. 16 is secured in place to the fuel rack by the hold-down plate of FIG. 18.

Referring to FIGS. 19A and 19B concurrently, the hold-down plate 600 is shown in its installed position wherein it is securing the neutron absorbing insert 500 in place within the cell of the fuel rack. The walls of the fuel rack are illustrated in phantom for ease of illustration. The installation of the neutron absorbing insert 500 into a cell of a fuel rack will no be discussed.

During installation of the neutron absorbing insert 500 into a cell of a fuel rack, the cell is initially empty (i.e., it does not contain a fuel assembly). In an initial step, the neutron absorbing insert 500 is coupled to a crane by using a hook that engages the holes 515 on the flanges 513, 514 of the sleeve 510. The neutron absorbing insert 500 is then aligned above the empty cell of the fuel rack and is lowered into the cell with its bottom end leading the way. The neutron absorbing insert 500 is lowered until the bottom flanges 516, 517 contact and rest atop the floor 700 of the fuel rack via a surface contact.

Once the neutron absorbing insert 500 is in place within the fuel cell, the hold-down plate 600 is then lowered/inserted into the fuel cell with an appropriate tool. At this stage, the barbs 601 of the hold-down plate are in an open position (i.e., bent toward the axis of the central hole 605. The hold-down plate 600 continues to be lowered until it contacts the upper surfaces of the bottom flanges 516, 517 of the neutron absorbing insert 500. At this time, the barbs 601 insert into the hole 705 of the floor 700 of the fuel rack in the open position (the barbs are in the closed position in FIGS. 19A-19B). The central hole 605 of the hold-down plate 600 is substantially aligned with the hole 705 of the floor 700 of the fuel rack. This allows the cooling water within the pool to freely flow into the fuel cell as needed and in an unimpeded manner. As can be seen the, bottom flanges 516, 517 of the neutron absorbing insert 500 are located between (i.e. sandwiched) the floor 700 of the fuel rack and the hold-down plate 600 at this time.

Figure 20:
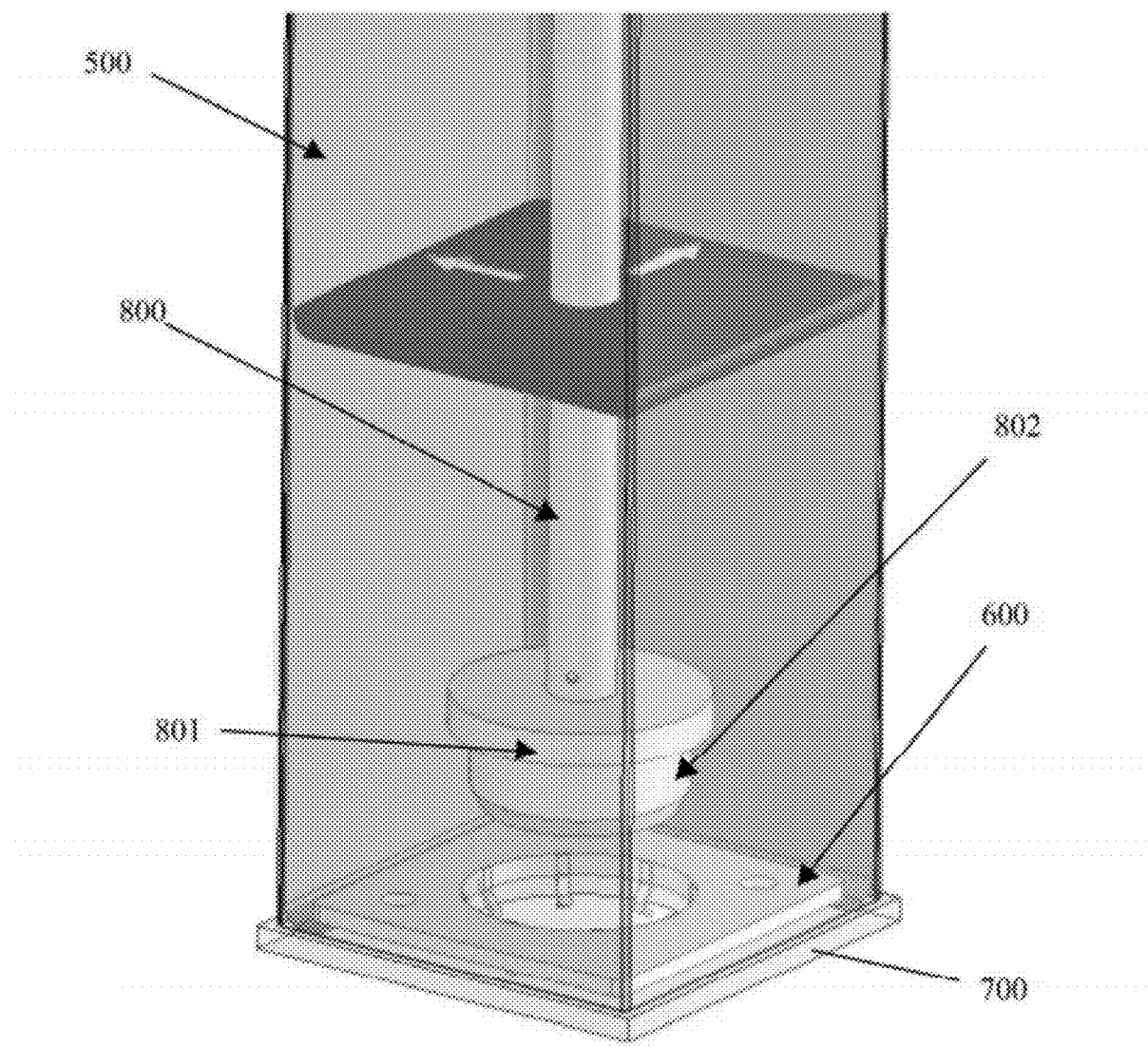
FIG. 20 is a perspective view of a plunger tool being inserted into a cell of a fuel rack to secure the hold-down plate of FIG. 18 to the fuel rack, the bottom flanges of the neutron absorbing insert being sandwiched therebetween.
Figure 21:
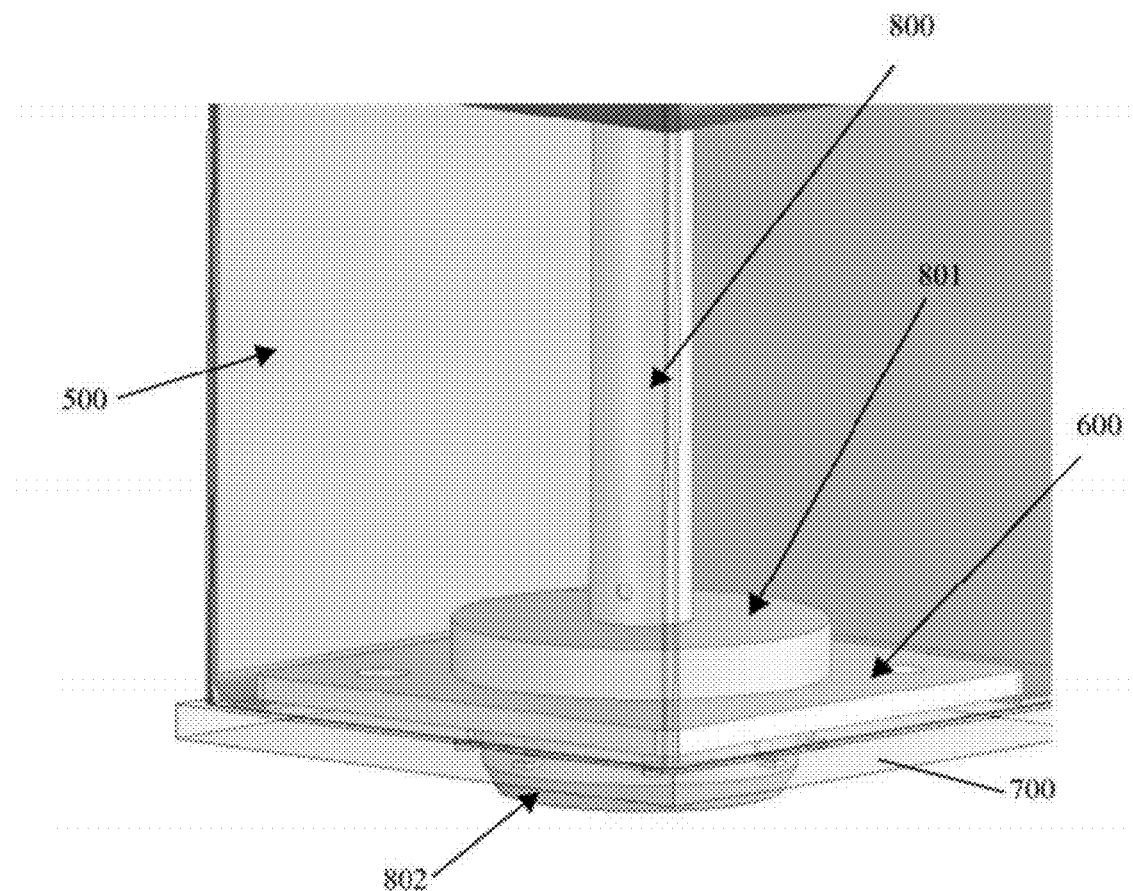
FIG. 21 a perspective view of the plunger tool fully inserted within the central hole of the hold-down plate of FIG. 18 having bent the securing pins/barbs into a locked position.
Figure 22:
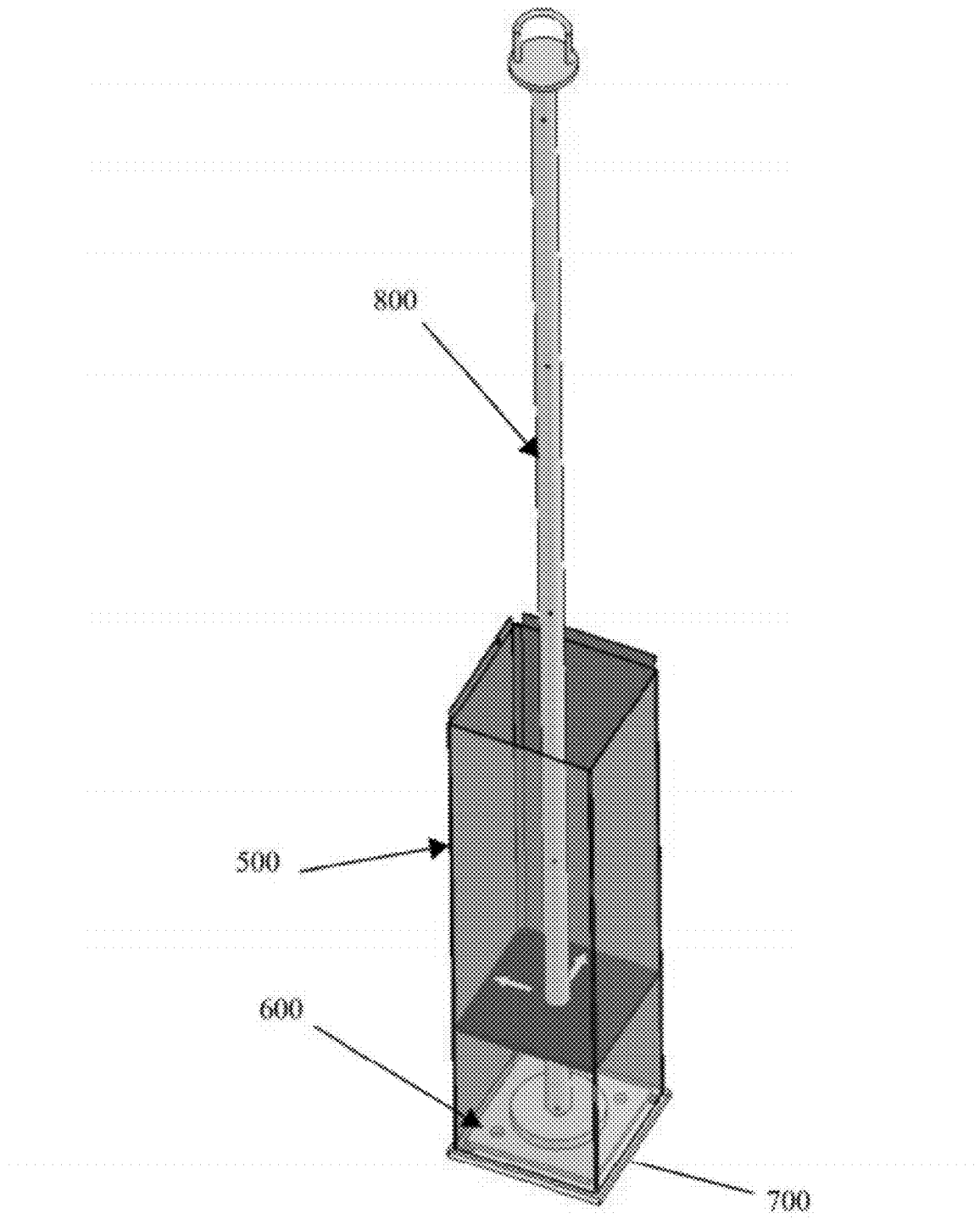
FIG. 22 is a perspective view of the entirety of the plunger tool.

Referring now to FIGS. 20-22 concurrently, once the hold-down plate 600 is in position, a plunger tool 800 is inserted into the fuel cell. A head 801 of the plunger tool 800 comprises a chamfered disc 802 that is inserted into the holed 605, 705. As the chamfered disc 802 slides through the holes 605, 705, the barbs 601 are bent outward (away from a central axis of the holes 605, 705). The barbs 601 are bent outward until their head portions slide under the floor 700 of the fuel rack and their elongated body portions contact the side walls of the holes 605, 705. As a result, the barbs 601 lock the hold-down plate 600 in place, thereby securing the neutron absorbing insert 500 in place within the fuel cell by compressing the bottom flanges 516, 517 between the floor 700 and the plate 600. Of course, other tools and locking mechanisms can be used.

Figure 23:
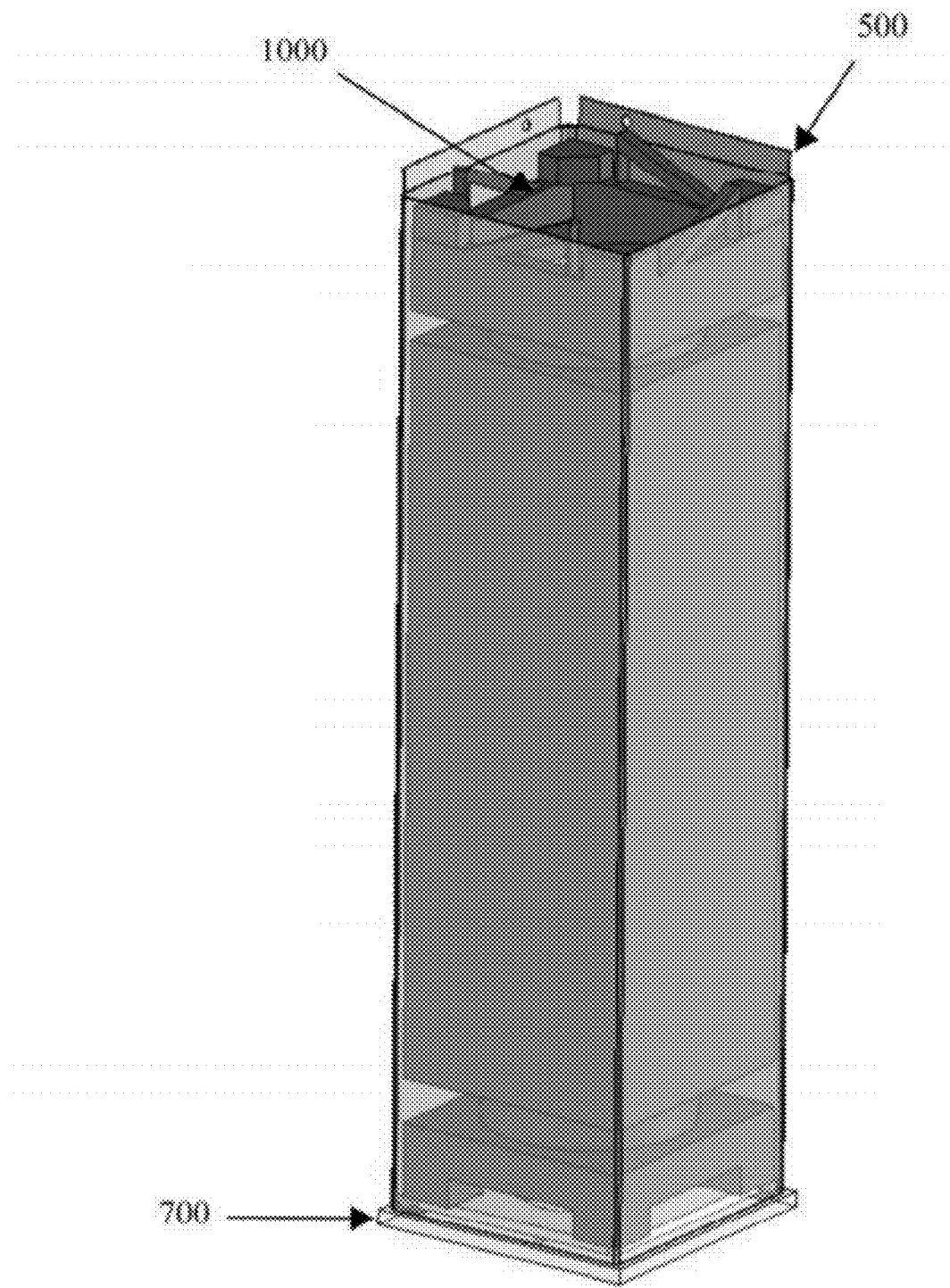
FIG. 23 is a perspective view of a fuel rack cell loaded with a fuel assembly and having the neutron absorbing insert of FIG. 16 fully installed.

Once the neutron absorbing insert 500 is secured in place, the fuel assembly 900 can be lowered safely into the fuel rack (FIG. 23).

The present invention has been described in relation to the accompanying drawings; however, it should be understood that other and further modifications, apart from those shown or suggested herein, may be made within the spirit and scope of the present invention. It is also intended that all matter contained in the foregoing description or shown in the accompanying drawings shall be interpreted as illustrative rather than limiting.

What is claimed is:

1. A neutron absorbing apparatus for insertion into a fuel rack comprising:
    a sleeve having a first wall and a second wall, the first and second walls forming a chevron shape; and
    the first and second wall being a single panel of a metal matrix composite having neutron absorbing particulate reinforcement bent into the chevron shape along a crease by a bending process.

2. The neutron absorbing apparatus of claim 1 further comprising an L-shaped reinforcement bar connected to a top end of the sleeve.

3. The neutron absorbing apparatus of claim 1 wherein the metal matrix composite having neutron absorbing particulate reinforcement is a boron carbide aluminum matrix composite material, a boron carbide steel matrix composite material, a carborundum aluminum matrix composite material or a carborundum steel matrix composite material.

4. The neutron absorbing apparatus of claim 1 wherein the metal matrix composite metal having neutron absorbing particulate reinforcement is at least 20% by volume neutron absorbing particulate.

5. The neutron absorbing apparatus of claim 1 wherein the metal matrix composite having neutron absorbing particulate reinforcement is a boron carbide aluminum matrix composite material that is at least 20% by volume boron carbide.

6. The neutron absorbing apparatus of claim 1 wherein the metal matrix composite having neutron absorbing particulate reinforcement is a boron carbide aluminum matrix composite material that is at least 25% by volume boron carbide.

7. The neutron absorbing apparatus of claim 6 wherein the crease has a radius of curvature between 0.375 to 0.625 inches, and the single panel has a gauge thickness between 0.065 to 0.120 inches.

8. The neutron absorbing apparatus of claim 1 further comprising at least one top flange at a top end of the sleeve, the flange formed by bending the single panel of the metal matrix composite having neutron absorbing particulate reinforcement.

9. The neutron absorbing apparatus of claim 8 further comprising at least one bottom flange at a bottom end of the sleeve, the flange formed by bending the single panel of the metal matrix composite having neutron absorbing particulate reinforcement.

10. The neutron absorbing apparatus of claim 9 wherein the sleeve has a central longitudinal axis, and wherein the at least one top flange extends from the sleeve away from the central longitudinal axis and the at least one bottom flange extends from the sleeve toward the central longitudinal axis.

11. The neutron absorbing apparatus of claim 1 further comprising:
    at least one bottom flange at a bottom end of the sleeve, the flange formed by bending the single panel of the metal matrix composite having neutron absorbing particulate reinforcement;
    wherein the sleeve has a central longitudinal axis; and
    wherein the at least one bottom flange extends from the sleeve toward the central longitudinal axis.

12. A system for supporting spent nuclear fuel in a submerged environment comprising:
    a fuel rack comprising a base plate and a gridwork of walls extending from the base plate so as to form an array of cells;
    a fuel assembly positioned within at least one of the cells of the fuel rack;
    at least one neutron absorbing insert comprising a sleeve having a first wall and a second wall, the first and second wall forming a chevron shape, and the first and second wall being a single panel of a metal matrix composite having neutron absorbing particulate reinforcement, the single panel bent into the chevron shape by a bending process; and
    the neutron absorbing insert positioned within the cell of the fuel rack so that the sleeve is located between the fuel assembly and the walls of the fuel rack.

13. The system of claim 12 wherein the metal matrix composite having neutron absorbing particulate reinforcement is a boron carbide aluminum matrix composite material, a boron carbide steel matrix composite material, a carborundum aluminum matrix composite material or a carborundum steel matrix composite material.

14. The system of claim 12 wherein the metal matrix composite having neutron absorbing particulate reinforcement is a boron carbide aluminum matrix composite material that is at least 25% by volume boron carbide.

15. The system of claim 14 wherein the crease has a radius of curvature between 0.375 to 0.625 inches, and the single panel has a gauge thickness between 0.065 to 0.120 inches.

16. The system of claim 12 further comprising at least one top flange at a top end of the sleeve, the flange formed by bending the single panel of the metal matrix composite having neutron absorbing particulate reinforcement.

17. The system of claim 16 wherein the sleeve has a central longitudinal axis, and wherein the at least one top flange extends from the sleeve away from the central longitudinal axis in an inclined orientation so as to form a funnel into the cell.

18. The system of claim 12 further comprising further comprising:
    at least one bottom flange at a bottom end of the sleeve, the flange formed by bending the single panel of the metal matrix composite having neutron absorbing particulate reinforcement;
    wherein the sleeve has a central longitudinal axis;
    wherein the bottom flange extends from the sleeve toward the central longitudinal axis, the bottom flange resting on a top surface of the base plate of the fuel rack.

19. The system of claim 18 further comprising:

a plate that is a separate and non-unitary structure from the neutron absorbing insert, the plate comprising a central hole and a plurality of barbs extending downward from plate about the central hole; and the plate positioned within the cell below the fuel assembly and atop the bottom flange of the neutron absorbing insert so that the barbs extend into a flow hole in the base plate of the fuel rack and engage the base plate of the fuel rack, the bottom flange of the neutron absorbing insert being compressed between the plate and the base plate.

20. A method of manufacturing a neutron absorbing apparatus comprising:

a) providing a roll of boron carbide aluminum matrix composite;

b) hot rolling the roll of boron carbide aluminum matrix composite;

c) straightening and flattening the roll of boron carbide aluminum matrix composite using a hot roll leveler to create a single panel of boron carbide aluminum matrix composite;

d) shearing the single panel of boron carbide aluminum matrix composite to a desired geometry; and e) bending the single panel boron carbide aluminum matrix composite into a chevron shape having first and second longitudinal walls.

21. The method of claim 20 wherein the panel of boron carbide aluminum matrix composite is maintained at a temperature above 750 degrees Fahrenheit during the bending step.

22. The method of claim 21 wherein the bending is performed with a brake press having a brake punch and a die, and wherein the brake press and die are heated to a temperature greater than above 500 degrees Fahrenheit during the bending step.

* * * * *